US009928713B2

(12) United States Patent
Baczuk et al.

(10) Patent No.: US 9,928,713 B2
(45) Date of Patent: Mar. 27, 2018

(54) LOCKS FOR WEARABLE ELECTRONIC BANDS

(71) Applicant: KiLife Tech, Inc., Orem, UT (US)

(72) Inventors: Jordan Alan Baczuk, Springville, UT (US); Spencer Kimball Behrend, Orem, UT (US)

(73) Assignee: KiLife Tech, Inc., Orem, UT (US)

( * ) Notice: Subject to any disclaimer, the term of this patent is extended or adjusted under 35 U.S.C. 154(b) by 0 days.

(21) Appl. No.: 15/299,191

(22) Filed: Oct. 20, 2016

(65) Prior Publication Data

US 2017/0039833 A1 Feb. 9, 2017

Related U.S. Application Data

(63) Continuation-in-part of application No. 15/052,617, filed on Feb. 24, 2016.

(Continued)

(51) Int. Cl.
*H04B 1/20* (2006.01)
*G08B 21/02* (2006.01)
(Continued)

(52) U.S. Cl.
CPC ........ *G08B 21/0266* (2013.01); *A44C 5/2071* (2013.01); *E05B 47/0002* (2013.01);
(Continued)

(58) Field of Classification Search
CPC .................................................. A44C 5/2071
(Continued)

(56) References Cited

U.S. PATENT DOCUMENTS 6,529,131 B2    3/2003   Wentworth
6,563,427 B2    5/2003   Bero et al.
(Continued)

FOREIGN PATENT DOCUMENTS

KR    1020080060507 A    6/2008
KR    1020110052832 A    5/2011
KR    1020140029371 B1    11/2014

OTHER PUBLICATIONS

International Search Report and Written Opinion for related PCT Application PCT/US2016/057957, dated Jan. 24, 2017, pp. 1 to 15.
(Continued)

*Primary Examiner* — Santiago Garcia
(74) *Attorney, Agent, or Firm* — Pillsbury Winthrop Shaw Pittman LLP

(57) ABSTRACT

Provided is an electronic lock for wearable electronics, the electronic lock including: a button assembly; a spring assembly coupled to the button assembly, the spring assembly comprising: two bent arms configured to compress under a force applied to the button assembly; and an aperture configured to receive a stopping element when the locking mechanism is in a locked position; an actuator configured to electronically control movement of the stopping element in and out of the aperture; and a control circuit comprising: a tangible non-transitory machine readable media storing instructions that when executed by one or more processors of the control unit effectuate operations comprising: receiving a request to unlock the locking mechanism; sending a request for authentication; receiving authentication information; and controlling the actuator to move the stopping element from the locked position.

20 Claims, 24 Drawing Sheets

Related U.S. Application Data

(60) Provisional application No. 62/244,042, filed on Oct. 20, 2015, provisional application No. 62/384,448, filed on Sep. 7, 2016, provisional application No. 62/120,334, filed on Feb. 24, 2015.

(51) Int. Cl.

| | |
|---|---|
| *E05B 47/00* | (2006.01) |
| *E05B 73/00* | (2006.01) |
| *A44C 5/20* | (2006.01) |
| *H04B 7/155* | (2006.01) |
| *H04W 4/00* | (2018.01) |
| *H04W 4/02* | (2018.01) |
| *G08B 21/04* | (2006.01) |
| *H04B 17/27* | (2015.01) |

(52) U.S. Cl.
CPC .......... *E05B 73/00* (2013.01); *G08B 21/0211* (2013.01); *G08B 21/0277* (2013.01); *H04B 7/155* (2013.01); *H04W 4/005* (2013.01); *H04W 4/008* (2013.01); *H04W 4/023* (2013.01); *G08B 21/0222* (2013.01); *G08B 21/0225* (2013.01); *G08B 21/0283* (2013.01); *G08B 21/043* (2013.01); *G08B 21/0446* (2013.01); *H04B 17/27* (2015.01)

(58) Field of Classification Search
USPC ...................................................... 340/4.42
See application file for complete search history.

(56) References Cited

U.S. PATENT DOCUMENTS

| | | |
|---|---|---|
| 6,967,562 B2 | 11/2005 | Menard et al. |
| 7,164,354 B1 | 1/2007 | Panzer |
| 7,636,047 B1 | 12/2009 | Sempek |
| 8,140,012 B1 | 3/2012 | Causey et al. |
| 8,382,681 B2 * | 2/2013 | Escutia ................ A61B 5/1411 33/512 |
| 8,529,553 B2 | 9/2013 | Mounce et al. |
| 8,731,156 B1 | 5/2014 | White et al. |
| 9,002,372 B2 | 4/2015 | Shakespeare et al. |
| 9,129,502 B2 | 9/2015 | Naim et al. |
| 9,251,686 B1 | 2/2016 | Reich et al. |
| 9,300,555 B2 | 3/2016 | Mukherjee et al. |
| 2003/0063003 A1 | 4/2003 | Bero et al. |
| 2003/0116596 A1 * | 6/2003 | Terasawa ............ A44C 5/0007 224/179 |
| 2003/0210147 A1 | 11/2003 | Humbard |
| 2004/0021567 A1 | 2/2004 | Dunn |
| 2005/0200487 A1 | 9/2005 | O'donnell et al. |
| 2006/0074494 A1 | 4/2006 | Mcfarland |
| 2006/0199534 A1 | 9/2006 | Smith et al. |
| 2008/0001814 A1 | 1/2008 | Durst et al. |
| 2008/0055072 A1 | 3/2008 | Holoyda |
| 2008/0062120 A1 | 3/2008 | Wheeler et al. |
| 2010/0085193 A1 | 4/2010 | Boss et al. |
| 2010/0160744 A1 | 6/2010 | Ha et al. |
| 2010/0253504 A1 | 10/2010 | Lliteras et al. |
| 2010/0315242 A1 | 12/2010 | Bullard et al. |
| 2012/0086574 A1 | 4/2012 | Blumel et al. |
| 2012/0092156 A1 | 4/2012 | Tran |
| 2012/0126973 A1 | 5/2012 | Deangelis et al. |
| 2013/0187789 A1 | 7/2013 | Lowe |
| 2013/0257616 A1 | 10/2013 | Taylor et al. |
| 2014/0025234 A1 | 1/2014 | Levien et al. |
| 2014/0119312 A1 | 5/2014 | Doetsch et al. |
| 2014/0143785 A1 | 5/2014 | Mistry et al. |
| 2014/0320312 A1 | 10/2014 | Sager et al. |
| 2014/0348186 A1 | 11/2014 | Ogata et al. |
| 2014/0362710 A1 | 12/2014 | Mukherjee et al. |
| 2015/0084769 A1 | 3/2015 | Messier et al. |
| 2015/0161878 A1 | 6/2015 | Eisenman |
| 2015/0163631 A1 | 6/2015 | Quam et al. |
| 2015/0192658 A1 | 7/2015 | Ullah et al. |
| 2015/0247913 A1 | 9/2015 | Messier et al. |
| 2015/0269699 A1 | 9/2015 | Burgess et al. |
| 2015/0269824 A1 | 9/2015 | Zhang |
| 2015/0332573 A1 | 11/2015 | Selmanovic et al. |
| 2015/0339910 A1 | 11/2015 | Stenzler et al. |
| 2015/0356848 A1 | 12/2015 | Hatch |
| 2015/0365979 A1 * | 12/2015 | Park ................ H04W 76/007 455/404.2 |
| 2016/0005304 A1 | 1/2016 | Curatolo et al. |
| 2016/0034696 A1 | 2/2016 | Jooste et al. |
| 2016/0035205 A1 | 2/2016 | Messenger et al. |
| 2016/0044521 A1 | 2/2016 | Doh et al. |
| 2016/0063836 A1 | 3/2016 | Fishwick |
| 2016/0065831 A1 * | 3/2016 | Howard ............ H04N 5/23206 348/211.2 |
| 2016/0110571 A1 | 4/2016 | Jung et al. |
| 2016/0342176 A1 * | 11/2016 | Han ................... G06F 1/163 |

OTHER PUBLICATIONS

'A Billion-Dollar Bracelet Is the Key to a Disney Park', The New York Times, http://nyti.ms/1dPnL7Z, Apr. 1, 2014, pp. 1 to 4.
'Keep the kids on a virtual leash', http://www.gizmag.com/mommy-im-here-virtual-child-leash/178421, Feb. 10, 2011, pp. 1 to 4.
'Keeping Kids on a Wireless Leash', Tech News World, http://www.technewsworld.com/story/51425.html, Jun. 29, 2006, pp. 1 to 3.
'The Kiddo Kidkeeper Keeps Your Child on a Digital Leash', Gizmodo, htlp://gizmodo.com/362075/the-kiddo-kidkeeper-keeps-your-child-on-a-digital-leash, Feb. 28, 2008, p. 1 to 1.
'FiLIP is an electronic leash for your kids' wrists and it's coming to AT&T', Engadget, http://www.engadget.com/2013/10/07/lilip-electronic-leash-smartwatch-attl, Oct. 7, 2013, pp. 1 to 8.
International Search Report and Written Opinion for related PCT Application PCT/US2016/019378, dated May 26, 2016, pp. 1 to 17.
Non-Final Office Action for related U.S. Appl. No. 15/052,617, dated Jul. 11, 2016, pp. 1 to 14.
Final Office Action for related U.S. Appl. No. 15/052,617, dated Jan. 27, pp. 1 to 32.

* cited by examiner

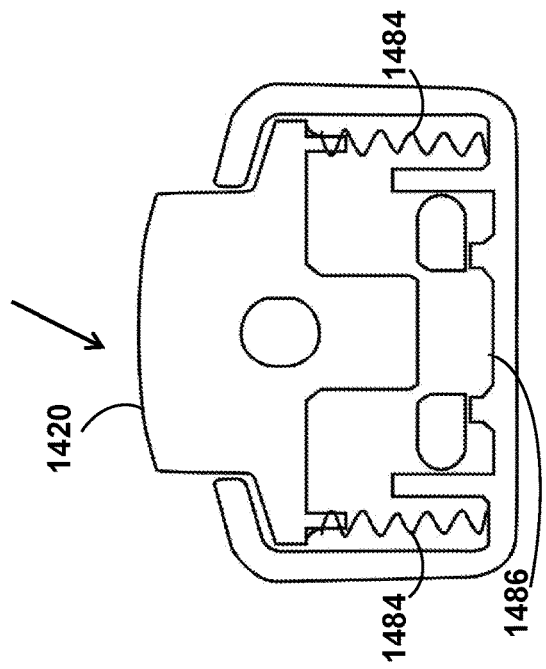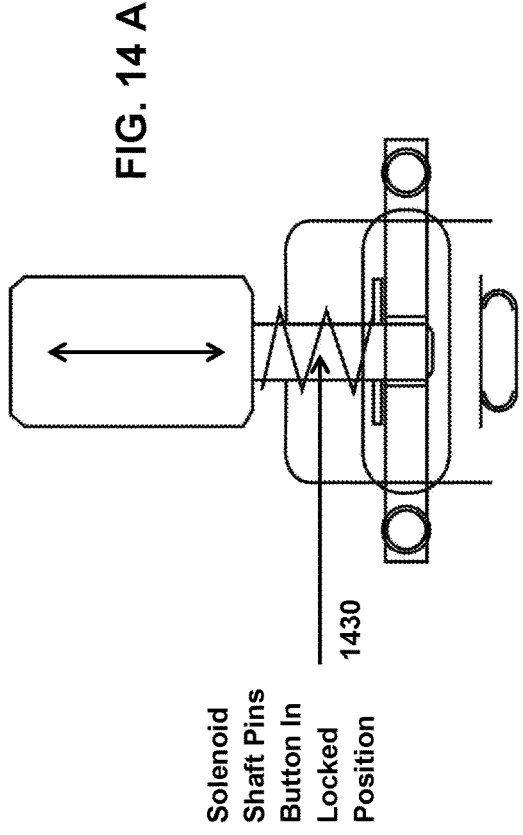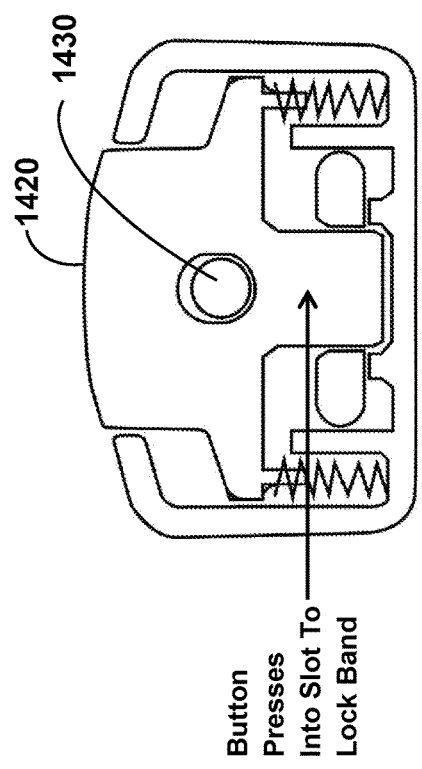

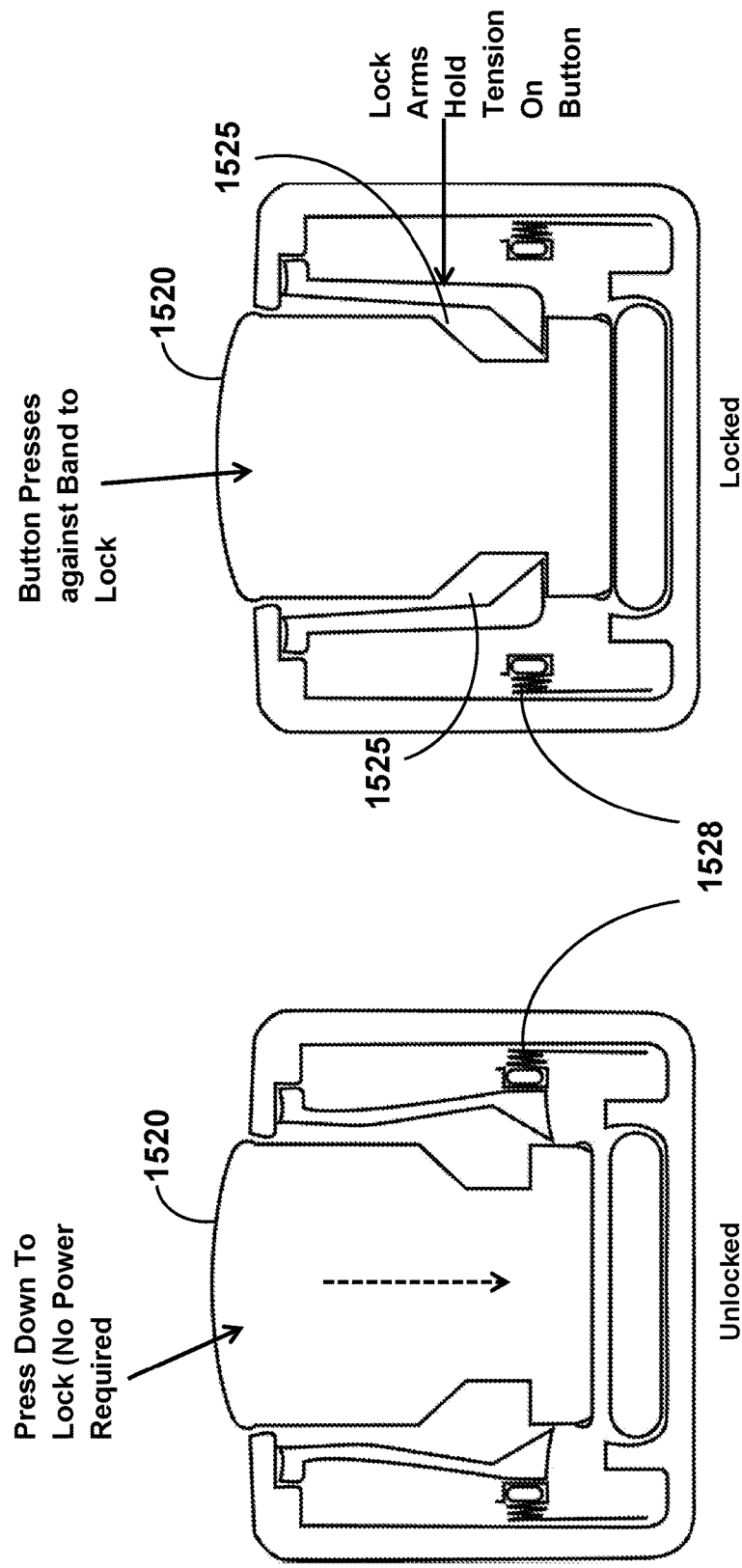

LOCKS FOR WEARABLE ELECTRONIC BANDS

CROSS-REFERENCE TO RELATED APPLICATIONS

The present application claims the benefit of U.S. Provisional Patent Application 62/244,042, filed 20 Oct. 2015, titled MONITORING DEPENDENT INDIVIDUALS, claims the benefit of U.S. Provisional Patent Application 62/384,448, filed 7 Sep. 2016, titled MONITORING DEPENDENT INDIVIDUALS, and is a continuation-in-part of U.S. patent application Ser. No. 15/052,617, filed 24 Feb. 2016, titled MONITORING DEPENDENT INDIVIDUALS, which claims the benefit of U.S. Provisional Patent Application 62/244,042 and U.S. Provisional Patent application 62/120,334, filed 24 Feb. 2015, titled MONITORING DEPENDENT INDIVIDUALS, each of which is incorporated by reference in its entirety.

BACKGROUND

1. Field

The present invention relates generally to monitoring systems and, more specifically, to systems and methods for locking a wearable monitor system.

2. Description of the Related Art

In many environments, individuals with underdeveloped and/or impaired ability to determine safety and health hazards need to be monitored. Individuals requiring monitoring may include children, special needs individuals, dementia patients, persons prone to wander, persons with mental disabilities, etc. For a caregiver or supervisor to appropriately monitor the safety of such an individual, it is often desirable for the individual to remain within a specified physical proximity of a caregiver or other supervisor. However, such individuals may be ambulatory or have other mechanisms for movement, such as, for example, a wheel chair, giving them the ability to move outside of the specified physical proximity and making them more difficult to monitor.

Monitoring difficulties may increase when a single caregiver or small number of caregivers is tasked with monitoring a larger group of individuals. Monitoring difficulties may also increase depending on the location and/or environment where monitoring is to occur. For example, it may be more difficult to monitor such individuals in a crowd or in locations with limited line of sight.

Moreover, many wearable electronics (whether for monitoring or other purposes) lack adequate ways of attaching the wearable device to a human limb, such as an arm or leg. In many cases, the wearable device can be removed by a child or other wearer who is not trusted to make good decisions regarding whether the device should remain on or be removed. And many locks used in the criminal justice system, like on ankle monitors for criminals, are too difficult to remove for other use cases in which the wearable is frequently removed, like daily or between trips for a child.

SUMMARY

The following is a non-exhaustive listing of some aspects of the present techniques. These and other aspects are described in the following disclosure.

Some aspects include a locking mechanism for a wearable child-monitor system. The locking mechanism comprising: a button assembly; a spring assembly coupled to the button assembly, the spring assembly comprising: two bent arms configured to compress under a force applied to the button assembly; and an aperture configured to receive a stopping element when the locking mechanism is in a locked position; an actuator configured to electronically control movement of the stopping element in and out of the aperture; and a control circuit comprising: a tangible non-transitory machine readable media storing instructions that when executed by one or more processors of the control unit effectuate operations comprising: receiving a request to unlock the locking mechanism; sending a request for authentication; receiving authentication information; and controlling the actuator to move the stopping element from the locked position.

BRIEF DESCRIPTION OF THE DRAWINGS

The above-mentioned aspects, and other aspects of the present techniques, will be better understood when the present application is read in view of the following figures in which like numbers indicate similar or identical elements:

FIGS. 14A-C illustrate a top view and cross sections views respectively of an example of electronic lock in accordance with embodiments of the present techniques;

FIG. 18C illustrates a cross section view of an example electronic lock assembly in accordance with embodiments of the present techniques;

Figure 1:
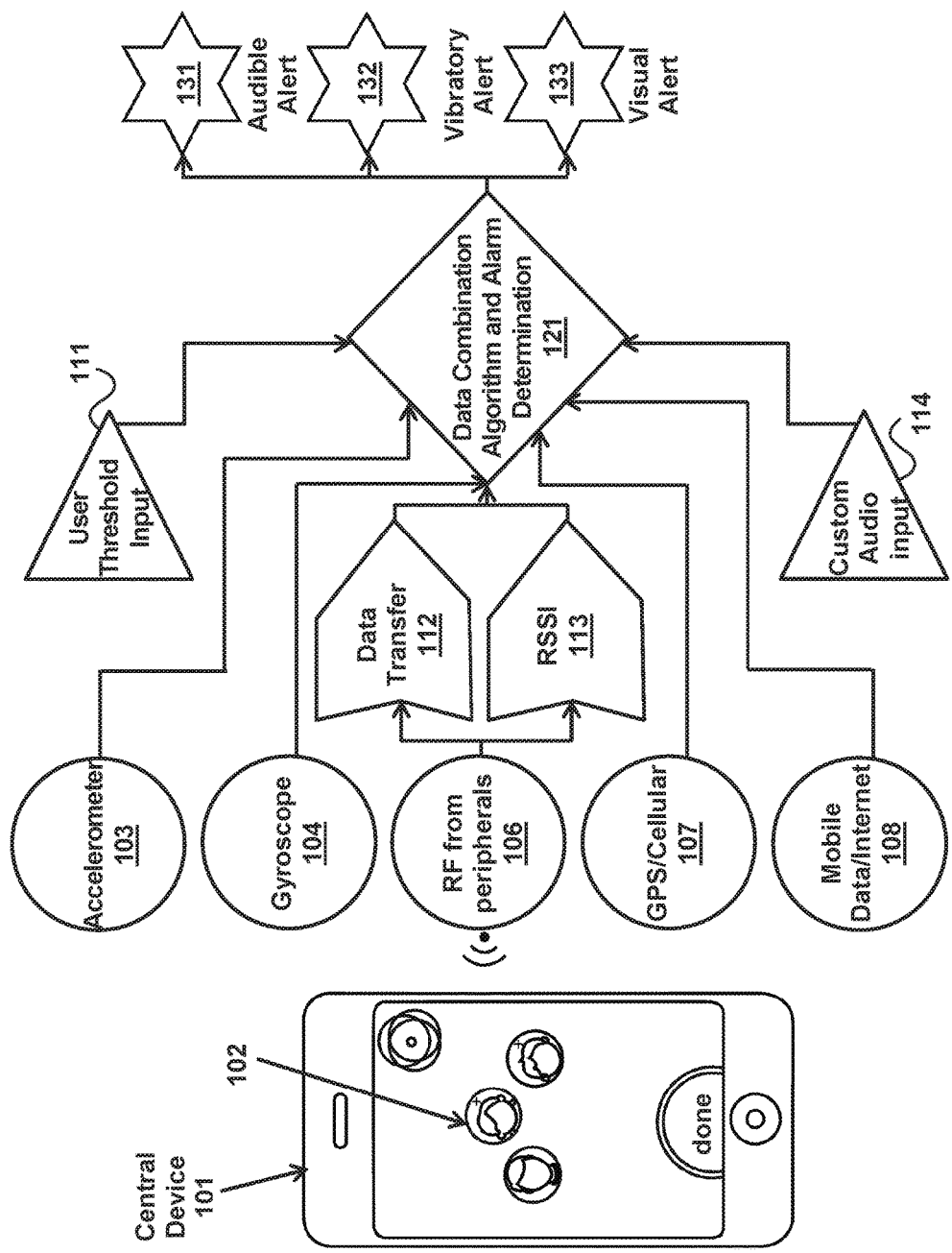
FIG. 1 illustrates an example computer architecture of a central device in accordance with embodiments of the present techniques.

While the inventions are susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the applicants had to both invent solutions and, in some cases just as importantly, recognize problems overlooked (or not yet foreseen) by others in the field of monitoring systems. Indeed, applicants wish to emphasize the difficulty of recognizing those problems that are nascent and will become much more apparent in the future should trends in monitoring systems industry continue as applicants expect. Further, because multiple problems are addressed, it should be understood that some embodiments are problem-specific, and not all embodiments address every problem with traditional systems described herein or provide every benefit described herein. That said, improvements that solve various permutations of these problems are described below.

An electronic lock for wearable electronics is described below with reference to FIGS. 8-21. In some cases, this lock may mitigate some of the above-described issues with traditional systems for attaching wearable electronics to human limbs. The electronic lock has a variety of use cases, including for criminal monitoring, medical devices, wearable fitness monitors, and child monitoring bands.

Some embodiments of the lock may address a number of other problems with alternate traditional designs. In some cases, the lock may be mechanically robust to being removed, while using relatively little electrical power when the lock is electronically unlocked (or in some cases, locked). In some embodiments, the lock may combine manual locking with electronic, wirelessly controlled unlocking, such that the amount of battery power drawn by the lock is relatively low, facilitating longer charging times and battery life on wearable electronics, which are often designed with relatively small batteries to avoid impeding movement of the wearer.

While the lock is not limited to wearable monitoring devices (which is not to imply that any other feature is not amenable to variation), the lock may be used with a suite of other inventions that solve various issues with traditional monitoring devices. In some cases, the lock synergistically leverages certain interfaces afforded by these other inventions and, as such, embodiments are described below in the context of these other inventions. But this description should not be read to imply that all embodiments must include all of these inventions, as the various techniques are independently useful.

Existing monitoring techniques are lacking. Many such systems consume excessive amounts of battery power, often requiring heavier batteries than can be borne by weaker individuals, like small children. Many such systems suffer from excessive false positive rates, which can render the system unusable. Finally, some existing techniques emit wireless signals that convey more information to third parties than is desirable for privacy reasons.

Some embodiments provide mechanisms for efficiently monitoring one or more individuals. In some cases, a system of two or more wireless devices in communications with each other can help a user (e.g., a supervisor or caregiver) monitor other individuals (e.g., children, and/or other dependents) by alerting the supervisor or caregiver when an event (like a a pre-defined event or an anomalous event) occurs. Examples of wireless devices associated with an individual being monitored may include smart bands, tags, smartphones, tablets, and/or other mobile devices. For example, an alert may be generated when communication between the wireless devices is interrupted (communication between the devices may be a one way communication, and/or two way communication). In some cases, wireless signals may include periodic beacons of a power, duration, and frequency selected to conserve battery power in a wearable monitoring device, like a Low Energy Bluetooth™ beacon. In some cases, information in the beacon may be encoded in a way that protects privacy of individuals being monitored. In some cases, various techniques, like sensor fusion, or integrating a signal from an accelerometer may augment measures of distance based on received beacon signal strength to reduce false-positive rates. That said, several inventions are described, and not all embodiments use all of the inventions, which are independently useful, or provide all of these benefits.

An individual may be monitored for a variety of reasons. For example, individuals lacking cognitive skills to independently recognize potentially dangerous or harmful situations are monitored. The alert may be generated to indicate that the individual may be potentially in an inappropriate situation. Lack of cognitive skills can be due to an individual's age, an individual's physical disabilities, an individual's mental disabilities, etc. The use of the monitoring system is not limited to individuals lacking cognitive skills. Other examples of use may include monitoring one or more individuals in crowded environments. For example, a group of friends going out together (e.g., to a show, concert, amusement park, beach, hike, etc.) may decide to monitor each other for safety reasons, and/or so it's easy for them to find each other. Other examples may include monitoring individuals with health issues, in these cases a health sensor may be associated with the wireless device (or the health sensor may act as the wireless device), and an alert may be generated if a health parameter measured by the sensor (e.g., heart rate, breathing parameters, blood oxygen, etc.) is outside a range (e.g., a pre-defined range), and/or if the measured health parameter breaches a threshold (e.g., a pre-defined threshold). In some cases, an alert may be generated if (e.g., in response to) a problem with the wireless device associated with the individual being monitored is detected. For example, a problem with functionality of the wireless device, or in the case of a wearable device a breakage of the wearable device, loss of contact between the wearable device and the individual being monitored (e.g., breakage of band, unlocking of the device, failure of locking mechanism, mechanical integrity of the band using an electrical circuit continuity sensor; state of band locking mechanism using electrical circuit continuity sensor; bad contact with a tag, etc.) In some cases, an alert may be generated based on a combination of parameters including one or more of the examples provided above, and/or other pre-defined parameters.

In some embodiments, a monitoring system may include a plurality of wirelessly communicating sensor devices, including a central device and a carryable or wearable peripheral device. The wireless connection may be a Bluetooth connection, e.g., Low Energy Bluetooth selected to conserve battery power, using 2 Mhz wide channels in 2.4-2.4835 GHz band, and transmitting with Gaussian frequency shift modulation, as specified in the Bluetooth core specification version 4.0, the low-energy portion of which is hereby incorporated by reference. Various techniques may be used to further reduce power consumption. In some cases, a beaconing rate may be modulated based on an estimated distance, e.g., the central device may send a signal indicative of the distance between the devices, and the peripheral device may lower the beaconing rate as distance to the next threshold distance increases. Or in some cases, the central device may beacon, and the peripheral device may only respond with its own beacon or alarm when the signal strength from the central device beacon approaches or exceeds a threshold. In some cases, the broadcast strength of beacons may be adjusted based on distance, e.g., the broadcast strength may be encoded in the beacon, and the strength may change as one device indicates to the other that the distance has changed, with stronger signals being used as devices move further apart.

Other embodiments may use Wi-Fi, Global System for Mobile Communications (GSM), Code division multiple access (CDMA), Ultra Low Frequency (ULF), and/or other mobile data protocols. In some cases, a monitoring system may include a central device, one or more stationary peripheral devices, and one or more carryable or wearable peripheral devices. The monitoring system may assist with the supervision of dependents to monitor and alert the supervisor/caregiver (or other users of the monitoring system) that a monitored individual is in a potentially dangerous situation based on distance, approximate location, motion, health information, and/or other information. Not only dangerous situations are monitored, wearable peripheral devices may be monitored for any reasons defined by the user of the monitoring system, in some use cases.

In some cases, the wireless connection between the control device and the carryable or wearable peripheral devices may be a Radio Frequency (RF) connection (e.g., Bluetooth, an Ultra-Low Frequency (ULF), a Wi-Fi, and/or other RF connections). Strength of a received wireless signal, as perceived at the central unit, from a signal broadcast by the peripheral device, may indicate the approximate location (as a location indicator) of the carryable or wearable peripheral devices with respect to the central unit. (Location need not be expressed in absolute coordinates for these purposes, and location may be expressed as an estimated distance, without indicating a direction.) For example, the user may set a range for communication data levels between the central device and the carryable or wearable peripheral devices. When the communications data levels (e.g., Received Signal Strength Indication (RSSI) power measurements or some other indication of relative received signal strength in a wireless environment) not within an acceptable predetermined range (e.g., less than a threshold), an alert may be presented at the control device and, in some embodiments, also at the carryable or wearable peripheral device. In some cases a location indicator threshold may be determined and if (e.g., in response to detecting that) the threshold is breached an alert is generated (the alert may be generated at the moment of the breach or before, or after the breach). In some cases, an alert may be generated if (e.g., in response to detecting that) the location indicator approaches a threshold or an upper or lower range in pre-determined range. This type of alerts may be a low level alert. Other types of alerts may be defined depending on the level of the breaching. For example, a vibrating alert may be a low level alert, and an audible alert may be a high level alert. Embodiments may compare a signal strength or estimated distance to a plurality of thresholds, each corresponding to a different alert level, and select an alert to present base on the highest threshold exceeded. Examples of alerts may include: vibratory related output (e.g., used to alert the wearable device wearer that the threshold has not been maintained or exceeded) in some cases the vibratory output may include adjustable parameters for persons with tactile sensitivity (e.g., amplitude; frequency; duration, etc.). Other examples of alerts may include: audible related output (e.g., high volume alarm to indicate approximate location of node; adjustable tone, volume, and sound pattern, voice commands for user to indicate actions to be taken to avoid danger, prerecorded, live, etc.); optical related output (e.g., light source used to alert any user of device alarm; adjustable intensity, color, and flashing pattern, etc.); and/or other types of alerts. Often caregivers face a high cognitive load, and a highly informative alert pattern may help the user to quickly assess the issue and either respond or disregard the alert. More informative alerts are expected to mitigate problems with false positives, as less intrusive alerts corresponding to smaller distances can be disregarded.

In response to an alert at the central device, the supervisor or caregiver can move to the physical location of the monitored individual to provide assistance, or take other action (try to re-establish contact with the monitored peripheral, call 911, etc.) In response to an alert at the carryable or wearable peripheral device and if a monitored individual has sufficient physical and/or mental capabilities to recognize and respond to the alert, the monitored individual may also take remedial action. In other cases, even if the monitored individual cannot take remedial action, the alert may help other people take action (e.g., someone may see or hear the alert and may be able to provide assistance to the individual, or the user (e.g., caregiver) may be able to hear or see the alert coming from the carryable or wearable peripheral device and thereby locating the individual, etc.) Alerts can include one or more of: visual, audible, and tactile (e.g., vibrations) components.

FIG. 1 illustrates an example computer architecture of a central device 101. Central device 101 is a control device configured to monitor one or more carryable or wearable (which is not to imply that wearable devices are not carryable) peripheral devices. In some embodiments, central device 101 (e.g., laptop computers, handheld computers, netbooks, tablets, smartphones, smartwatches, personal digital assistants (PDAs), cellular telephones, personal computers (PCs), and/or other computing platforms) may include a user interface 102. User interface 102 may allow a user (e.g., caregiver/supervisor) to connect to multiple carryable or wearable peripheral devices, stationary peripheral devices, and/or other components within or outside of the monitoring system. User interface 102 may be configured to set thresholds, acceptable ranges for sensory data and/or other alert parameters. In some embodiments, user interface 102 may be configured to produce the alerts (produce a visual, sound, tactile, and/or other alerts). In some cases, a wearable device on the caregiver may receive the alert from a smartphone via a personal area network and present the alert, e.g., via smartwatch or earpiece.

A carryable or wearable peripheral device may be configured to remain in contact with (e.g., be attached to) a monitored individual. A carryable or wearable peripheral device may emit signals indicative of the location, motion, and/or (when associated with the appropriate sensors) health data of the individual. A carryable or wearable peripheral device may be used by caregivers and/or monitored individuals. In some embodiments, carryable or wearable peripheral devices may include one or more processors, storage media, user interfaces, and or other components. Examples of carryable or wearable peripheral devices include wrist-born embedded systems having a radio, microprocessor, battery, and in some cases, a biometric sensor array. In some embodiments, the embedded system may include an inertial measurement unit, and the microprocessor may integrate inertial measurement signals and embed results in beacons to augment signal-strength based range-finding. In some cases, embodiments may be characterized as smart bands, tags, smartphones, watches, sensors (health sensors or other sensors) tablets, and other mobile devices. In some embodiments a smart band may be configured to fit on a wearer's body part (e.g., a wrist band, an ankle band, a chest band, a neck band, and/or other band that fits, and/or surrounds the wearer's body part). The smart band may be configured to include a locking mechanism that allows the user (monitor) to lock and unlock the band to prevent it from being removed. In some cases, the smart band may include an electrical circuit continuity sensor for monitoring mechanical integrity of the locking mechanism and detecting failure of the locking mechanism or breakage of the band.

In some embodiments, sensory data may include any data that may be monitored by a sensor at a central device, a stationary peripheral device, or a carryable or wearable peripheral device. For example: safety related sensory data, including: approximate location, and/or proximity data; motional data; physical data (e.g., impact, mechanical integrity, etc.); environmental data (e.g., temperature, humidity, optical, internet data, health related sensory data (e.g., heart rate, blood glucose, oxygen, body temperature skin humidity, EMG (muscular electrical activity), etc.)

A user may configure acceptable ranges and thresholds for sensory data by inputting user threshold input 111 to data combination algorithm and alarm determination 121. Threshold input 111 may indicate what conditions in sensory data cause what notifications, alerts, alarms, etc. In some cases, sensory and interne data may be provided by the central device 101's hardware, software, as well as via RF from peripheral stationary node(s) and peripheral wearable device(s). Received data is combined algorithmically to compare with user-defined thresholds. If the combined data is not within user defined thresholds (e.g., a carryable or wearable peripheral device is too far away from central device 101), different types of alarms (or other alerts or notifications) may be issued. Alarms (or other alerts or notifications) may be presented at central device 101 as one or more of: visual displays, sound, or vibrations having varied intensities based on the severity of the alarm.

In some embodiments, during operation, data combination algorithm and alarm determination 121 may receive input from one or more of accelerometer 103, gyroscope 104, Radio Frequency (RF) communication 106 from peripherals, Global Positioning System and Cellular communication 107 from peripherals, mobile data/Internet 108, custom audio input 114, and/or information from other sensors of components within or outside of the monitoring system.

For example, in some cases, data combination algorithm and alarm determination may receive information from accelerometer 103. Accelerometer 103 may be a single or multi-axis accelerometer. Such information may include measurement of the movement of the moveable peripherals (e.g., acceleration, number of steps taken by the individual associated with the peripheral, orientation, detect if the moveable peripherals fell or in the process of falling, etc.) In some cases if the individual falls, information from the accelerometer 103 may indicate the height of the fall and/or potential impact.

In some embodiments, data combination algorithm and alarm determination 121 may receive information from gyroscope (or other type of inertial measurement unit, like a three or six axis accelerometer) 104 (e.g., microelectromechanical systems MEMS gyroscope, and/or other types of gyroscopes). Such information may include measurement of orientation and/or rotation of the moveable peripherals. In some embodiments, information from accelerometer 103 and gyroscope 104 may be combined for more accurate motion and orientation sensing. In some embodiments, a compass (e.g., a magnetometer) for measuring orientation may be used instead of the gyroscope 104 or in conjunction with it. In some embodiments, data combination algorithm and alarm determination 121 may receive user audio input 114 may include sending audio to a wearable peripheral device in the form of a file or live broadcasting in order to alert/communicate with the person associated with (e.g., wearing) the wearable peripheral device. In other cases, the user input may be in the form of text input. Data combination algorithm and alarm determination 121 may process received input to determine if thresholds for any of audible alert 131, vibratory alert 132, or visual alert 133 (or any other notifications or alarms) are satisfied. The alerts (or other notifications or alarms) may be output at central device 101 or at a peripheral wearable device, for example, on screen, through a speaker, or through vibration of central device 101. An alert (or other notification or alarm) may also be sent from central device 101 to a carryable or wearable peripheral device that caused the alert (or other notification or alarm).

In some embodiments, in some cases, data combination algorithm and alarm determination may receive information from Global Positioning System (GPS), and/or Cellular triangulation (using GSM and/or CDMA technologies) indicating the approximate location of the monitored peripherals. In some embodiments, approximate location of the monitored peripherals may be extracted from mobile Data/Internet 108 sent or received by the peripherals (e.g., using technologies such as 3G, 4G, 4G LTE, and/or 5G).

In some embodiments, communication between the central device 101 and peripheral devices may be a radio frequency (RF) communication 106. In some cases, RF communications 106 may include one or more of Bluetooth, Wi-Fi, ultra-low frequency (ULF), and/or other RF communications. For example, in the case of a Bluetooth connection, central unit 101 may establish a Bluetooth connection with a moveable peripheral, a wearable smart band for example. Central unit 101 may be the master Bluetooth device (initiates the connection) and may be able communicate with the smart band and additional moveable or stationary peripherals (forming a Bluetooth network). In other cases, Central device 101 may switch roles with one of the peripherals and becomes a slave. In other cases, central device 101 may be a master and a slave. After establishing the connection, central device 101 may communicate monitoring settings to the smart band (and/or moveable or stationary peripherals). The monitoring settings may be defined by the user of central device 101 and sent wirelessly to the smart band (the settings may be sent via the Bluetooth connection, other wireless connections, and/or wired connection). In some cases, the settings may be input directly into the smart band (and/or moveable or stationary peripherals) via a user interface. An example of monitoring setting may be the Bluetooth connection, such that if the Bluetooth connection is interrupted an alert may be generated. Other examples of monitoring setting may include any pre-defined values for information exchanged between central device 101 and the smart band (and/or moveable or stationary peripherals) via the Bluetooth connection.

In some embodiments, monitoring settings may include communication data levels (e.g., a predetermined range, threshold levels, etc.) Data communication levels may include strength of received signal between the central device 101 and the smart band, and/or other indication of relative received signal strength in a wireless environment. Strength of received signal is usually referred to as received signal strength indicator (RSSI), and it represents a measurement of the power present in a received radio signal, the higher the RSSI the stronger the signal. The measurement of the RSSI may be done by wireless network cards in central device 101 and the smart band. RSSI values may be mapped to distance values through calibration In some embodiments, distance calculations may be augmented with inertial measurement unit readings on both the central device and the peripheral device. For instance, IMU readings may be polled and integrated by the wearable device, and a distance and direction of travel vector may be encoded in a beacon transmitted by the device. The central device may similarly monitor its own IMU and integrate signals to form another vector. The two vectors, one being received via the beacon, may be subtracted to calculate an IMU-based distance. The IMU based distance may be combined with a beacon signal strength-based distance at the central unit to ascertain distance, e.g., a signal-strength based distance measurement over a threshold distance may be disregarded for a duration of time in response to the IMU measurements indicating a smaller change in distance between the two units (as might happen if a child walks behind a wall or other signal-attenuating object). In some cases, the two devices may "zero" their IMU integrals in response to the signal strength exceeding a threshold corresponding to the two units being within one meter or so of one another to prevent drift from interfering with the measurements. Or another type of signal may be used to trigger an IMU integral re-sent, e.g., an ultrasonic chirp by the peripheral device may be received by a microphone of the central device and trigger an IMU integral re-zeroing.

In some embodiments, connection between device 101 and the smart band (and/or moveable or stationary peripherals) may be an ultra-low frequency (ULF) communication. ULF communications may be used for secure communications between device 101 and the peripherals as the ultra-low frequencies are able to penetrate the ground. In some embodiments, ULF frequency may range between 300 hertz and 3 kilohertz (other frequency ranges may be considered).

In some embodiments, a Wi-Fi communication may be used. For example, central unit 101 may communicate, via a Wi-Fi connection, with a moveable peripheral, the smart band (and/or moveable or stationary peripherals). In some embodiments the communication may be a direct communication between Central unit 101 and the peripherals without going through the access point (e.g., Wi-Fi is Tunneled Direct Link Setup (TDLS), and/or Wi-Fi DIRECT). An example of monitoring setting may be the Wi-Fi connection, such that if the Wi-Fi connection is interrupted an alert may be generated. Other examples of monitoring setting may include any pre-defined values for information exchanged between central device 101 and the smart band (and/or moveable or stationary peripherals) via the Wi-Fi connection.

In general, a control device can be used to configure the alert settings of the system and change settings of other devices wirelessly. A control device may also act as a peripheral wearable node in the case of a smartphone or tablet to increase accuracy of motional data gathered between the peripherals. When a control device acts as a peripheral wearable node, the control device can also have live-updating of known location. Live-updating can be facilitated by using Global Positioning System (GPS) on a control device and in connection with RSSI to determine an approximate location. Live-update can also be extended to using Wi-Fi access points to increase accuracy. Examples of control devices include smartphones, tablets, computers, or custom devices with a user interface.

In some embodiments, one or more stationary peripheral devices are used to communicate with carryable or wearable peripheral devices and monitor ranges. A stationary peripheral device may be used in tandem with other stationary peripheral devices and/or in tandem with carryable or wearable peripheral devices. A stationary peripheral device may have a further network connection to the control device. The stationary peripheral device may relay data for carryable or wearable peripheral devices back to the control device. As such, stationary peripheral devices may extend the reach of the monitoring system by permitting a control device to monitor data for a carryable or wearable peripheral device that is otherwise outside of communication range with the control device. In some embodiments, a stationary peripheral device may also be used to monitor the signal strength of a central device and/or other stationary peripheral devices. In one aspect, public Wi-Fi access points or mobile towers may be used as stationary devices.

Figure 2:
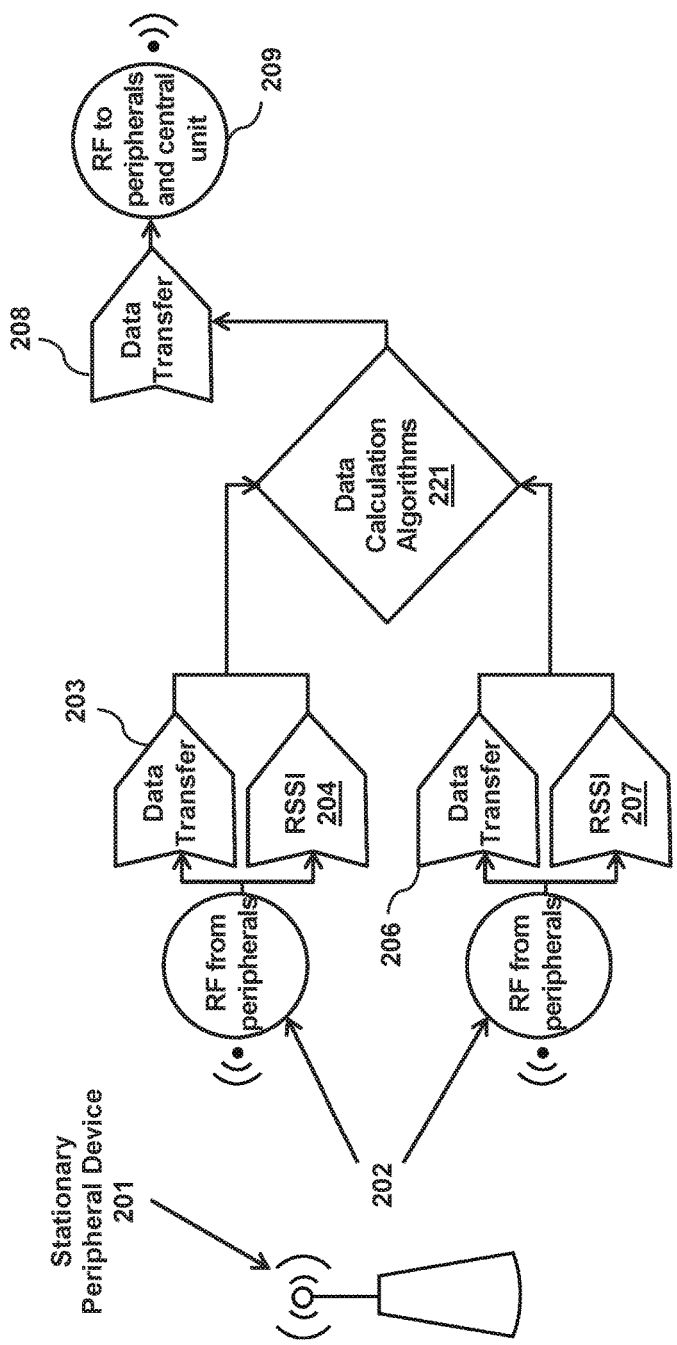
FIG. 2 illustrates an example computer architecture of a stationary peripheral device in accordance with embodiments of the present techniques.

FIG. 2 illustrates an example computer architecture of a stationary peripheral device 201. Stationary peripheral device 201 includes data calculation algorithms 221. Data calculation algorithms 221 may determine what data is to be transferred to a central device and/or other peripheral devices and when and how to transfer data to a central device and/or other peripheral devices. Data calculation algorithms 221 may receive RF communication 202 from other peripherals (either stationary or carryable/wearable). RF communication 202 may include data transfers 203 and 206 and RSSI 204 and 207. Data Calculation algorithms 221 may determine from data transfers 203 and 206 and RSSI 204 and 207 that data transfer 208 is to be sent to a central deice and/or other peripheral devices. Stationary peripheral device 201 may send data transfer 208 to central device and/or other peripheral devices through RF communication 209.

Figure 3:
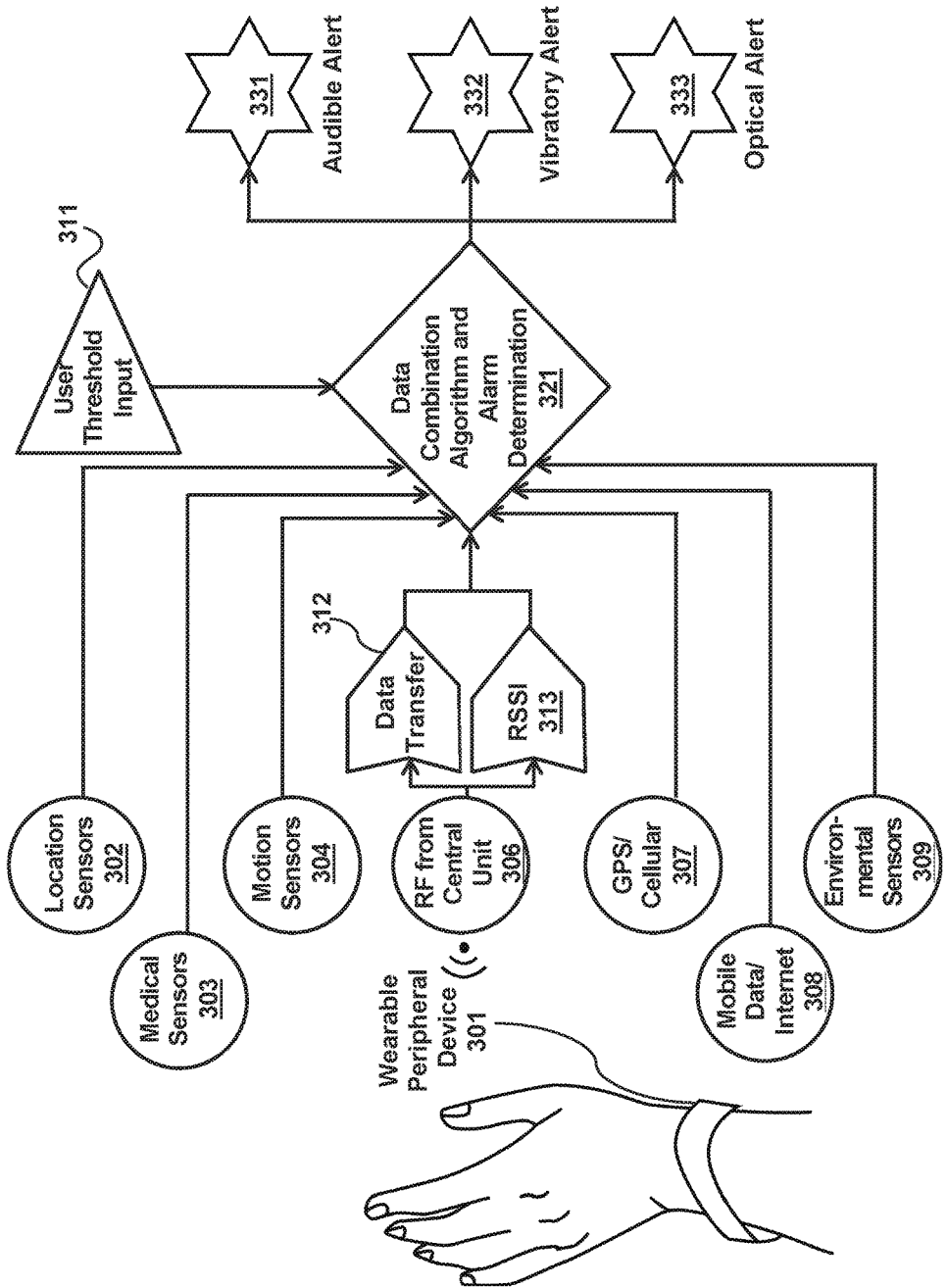
FIG. 3 illustrates an example computer architecture of a wearable peripheral device in accordance with embodiments of the present techniques.

FIG. 3 illustrates an example computer architecture of a wearable peripheral device 301. In some embodiments, sensory and internet data is provided by the wearable peripheral device 301's hardware as well as via RF from other peripheral devices(s) and a central device Received data is combined algorithmically to compare with user-defined thresholds. (Wearable peripheral device 301 may also send data). If the combined data is not within user defined thresholds (e.g., wearable peripheral 301 is too far away from a central device), different types of alarms (or other alerts or notifications) may be issued. Alarms (or other alerts or notifications) may be presented at wearable peripheral device 301 as one of more of: visual displays, sound, or vibrations having varied intensities based on the severity of the alarm.

In some embodiments, during operation, data combination algorithm and alarm determination 321 may receive input from any of: location sensors 302, medical sensors 303, motion sensors 304, Radio Frequency (RF) communication 306 from a central unit, Global Positioning System and Cellular communication 307, mobile data/Internet 308, and environmental sensors 309. RF communication 306 from a central unit may include data transfer 312 and RSSI 313. Data combination algorithm and alarm determination 321 may process received input to determine if thresholds for any of audible alert 331, vibratory alert 332, or visual alert 333 (or any other notifications or alarms) are satisfied. If so, the alerts (or other notifications or alarms) may be output at wearable peripheral device 301, for example, on a screen or LED, through a speaker, or through vibration of wearable peripheral device 301. An alert (or other notification or alarm) may also be sent from wearable peripheral device 301 to a central device or to s stationary peripheral device (for subsequent relay to a central device).

Sensors 303 may be configured to generate output signals conveying information related to the monitored individual. In some embodiments, sensors 303 may include health sensors, and/or other sensors. For example, sensors 303 may include one or more of a heart rate sensor, a blood pressure sensor/monitor, a weight scale, a blood glucose monitor, a blood oxygen saturation monitor (e.g., a pulse oximeter), a hydration monitor, a skin/body temperature thermometer, a respiration monitor, electroencephalogram (EEG) electrodes, and/or other medical sensors. Sensors may also include environmental sensors, like a water-immersion sensor. Information related to the monitored individual obtained from sensors 303 may include heart rate, blood pressure, weight, pulse rate, blood chemistry, blood oxygen saturation, blood glucose level, hydration information, respiration rate, breathing information, skin/body temperature, brain activity, etc. Sensors 303 are configured to generate any output signals conveying information related to the user that allows monitoring system 300 to function as described herein. In some embodiments, sensors 303 may be disposed in a plurality of locations within or outside of monitoring system 300. For example, sensors 303 may be located in wearable peripheral device 301, located in a medical device used by the user, and/or in other locations within or outside of monitoring system 300.

Figure 4:
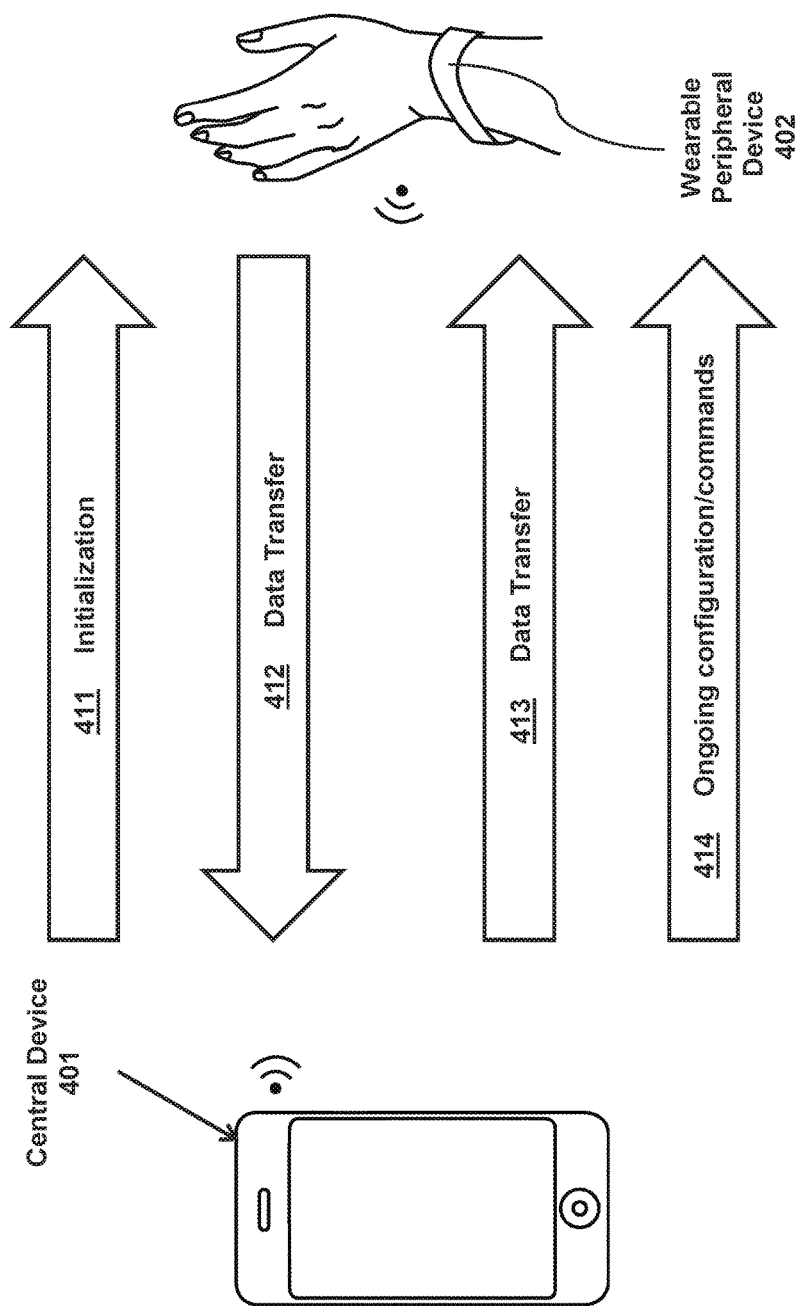
FIG. 4 illustrates an example data flow between a central device and a wearable peripheral device in accordance with embodiments of the present techniques.

FIG. 4 illustrates an example data flow between a central device 401 (e.g., a smart phone or mobile device) and a wearable peripheral device 402 (e.g., a smart band). Central device 401 may initialize 411 communications with wearable peripheral device 402 by establishing a wireless connection with wearable peripheral device 402. Central device 401 may send alarm (or other alert or notification) settings to wearable peripheral device 402 over the established wireless connection. The wireless connection may be any of Bluetooth, Wi-Fi, Global System for Mobile Communications (GSM), Code division multiple access (CDMA), Ultra Low Frequency (ULF), or other mobile data protocols.

Wearable peripheral device 402 may perform data transfer 412 to central device 401. Data transfer 412 may include wearable peripheral device 402 transferring sensory data to central device 401 using the established wireless connection. Central device 401 may analyze the sensory data in order to monitor the status of wearable peripheral device 402. Central device 401 may perform data transfer 413 to wearable peripheral device 402. Data transfer 413 may include central device 401 transferring local sensory data from the central device's local sensors to wearable peripheral device 402 over the established wireless connection.

Central device 401 may send ongoing configuration/commands 414 to wearable peripheral device 402. Ongoing configuration/commands 414 may include central device 401 updating alarm (or other alert or notification) settings of wearable peripheral device 402 over the established wireless connection. Ongoing configuration/commands 414 may also include central device 401 issuing alarms (or other alerts or notifications) over the established wireless connection in order to notify or locate the wearer of wearable peripheral device 402.

Devices may be arranged in a variety of different possible configurations to monitor an individual. A single link configuration includes a single control device and one or more carryable or wearable peripheral devices. In the single link configuration, the single control device monitors the one or more carryable or wearable peripheral devices. The single link configuration may be useful for a parent (with the control device) to monitor one or more children (each having an attached wearable peripheral device). In the single link configuration, communication may occur from the central device to any of the wearable peripheral devices, from any of the wearable peripheral devices to the central device, and from the Internet to the central unit and to any of the wearable peripheral devices.

Figure 5:
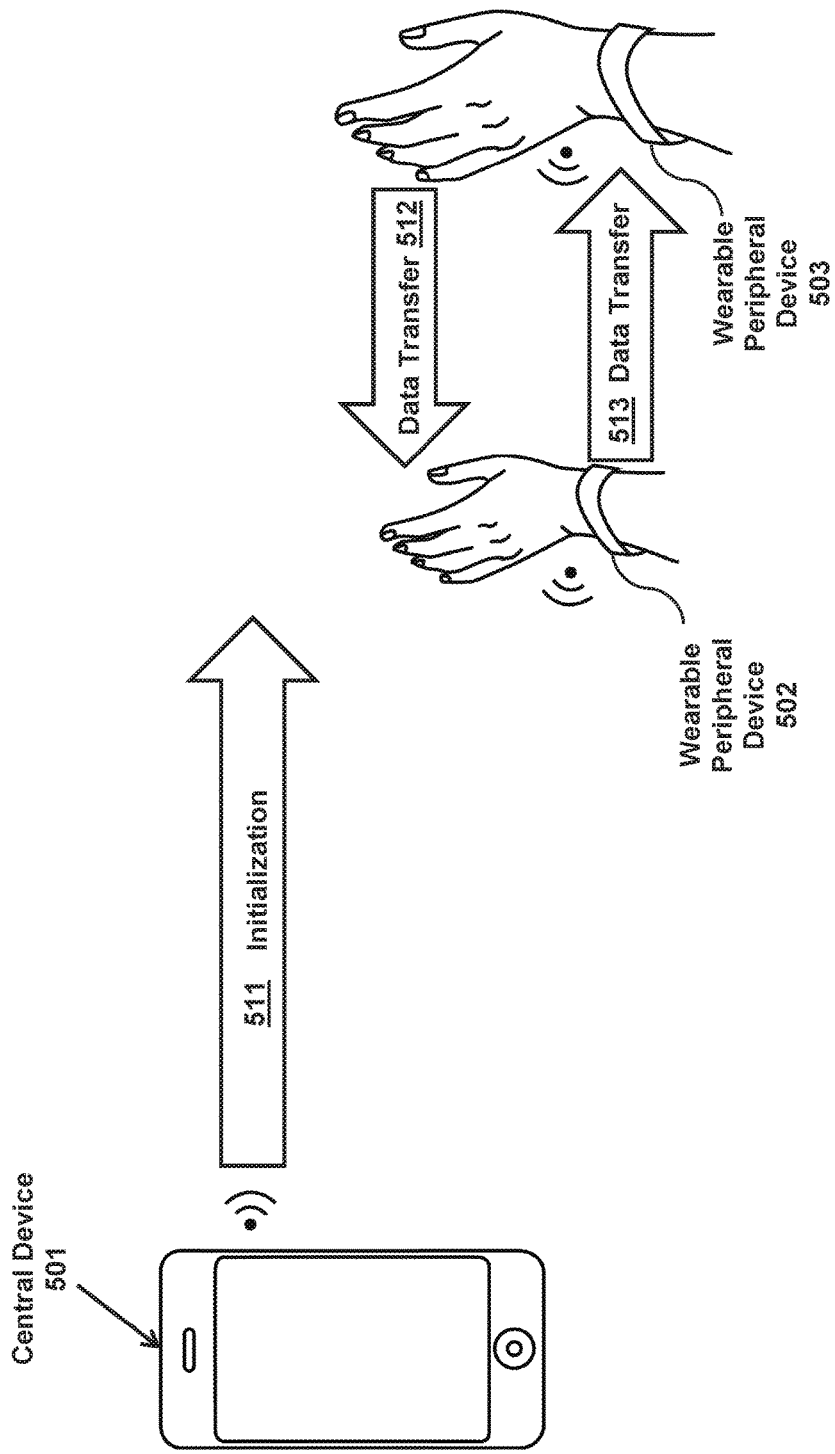
FIG. 5 illustrates an example data flow between a central device and multiple wearable peripheral devices in accordance with embodiments of the present techniques.

FIG. 5 illustrates an example data flow between a central device 501 (e.g., a smart phone or mobile device) and wearable peripheral devices 502 and 503 (e.g., smart bands). Central device 501 may initialize 511 communications with wearable peripheral devices 502 and 503 by establishing a wireless connection with wearable peripheral devices 502 and 503. Central device 501 may send alarm (or other alert or notification) settings to wearable peripheral devices 402 and 403 over the established wireless connection. The wireless connection may be any of Bluetooth, Wi-Fi, Global System for Mobile Communications (GSM), Code division multiple access (CDMA), Ultra Low Frequency (ULF), or other mobile data protocols. In some embodiments, wearable peripheral devices 502 and 503 may also establish a wireless connection between one another forming a tethered network. Wearable peripheral devices 502 and 503 may monitor one another over the tethered network.

Wearable peripheral device 503 may perform data transfer 512 to wearable peripheral device 502. Data transfer 512 may include wearable peripheral device 503 transferring sensory data to wearable peripheral device 502 over the tethered network. Wearable peripheral device 502 may analyze the sensory data in order to monitor the status of wearable peripheral device 503. Wearable peripheral device 502 may also trigger alarms, alerts, or other notifications on wearable peripheral device 503 and/or vice versa. In some embodiments, wearable peripheral device 502 may perform data transfer 513 to wearable peripheral device 503. Data transfer 513 may include wearable peripheral device 502 transferring sensory data to wearable peripheral device 503 over the tethered network. Wearable peripheral device 503 may analyze the sensory data in order to monitor the status of wearable peripheral device 502.

In some embodiments, a tethered network configuration may include one or more central devices and a plurality of carryable or wearable peripheral devices. In the single link configuration, the one or control devices monitor the plurality of carryable or wearable peripheral devices. The tethered network configuration may be useful for providing a buddy system, for example, on a field trip. In the tethered network configuration, individuals may both monitor other individuals and be monitored by other individuals. In the tethered network configuration, communication may occur from a central device to a carryable or wearable peripheral device, from a carryable or wearable peripheral device to a central device, from the Internet to a central unit and to a carryable or wearable peripheral device, between central devices, and between carryable or wearable peripheral devices.

A central node with remote control configuration includes a central device (remote), a stationary peripheral device, and one or more carryable or wearable peripheral devices. In the central node with remote control configuration, the stationary peripheral device monitors the one or more carryable or wearable peripheral devices and relays information to the central device. The central node with remote control configuration may be useful for remote supervision of individuals (e.g., children) within a home over the Internet. In the central node with remote control configuration communication may occur between the central device and stationary peripheral device and between the stationary peripheral device (e.g., over the Internet) and the one or more carryable or wearable peripheral devices.

Figure 6:
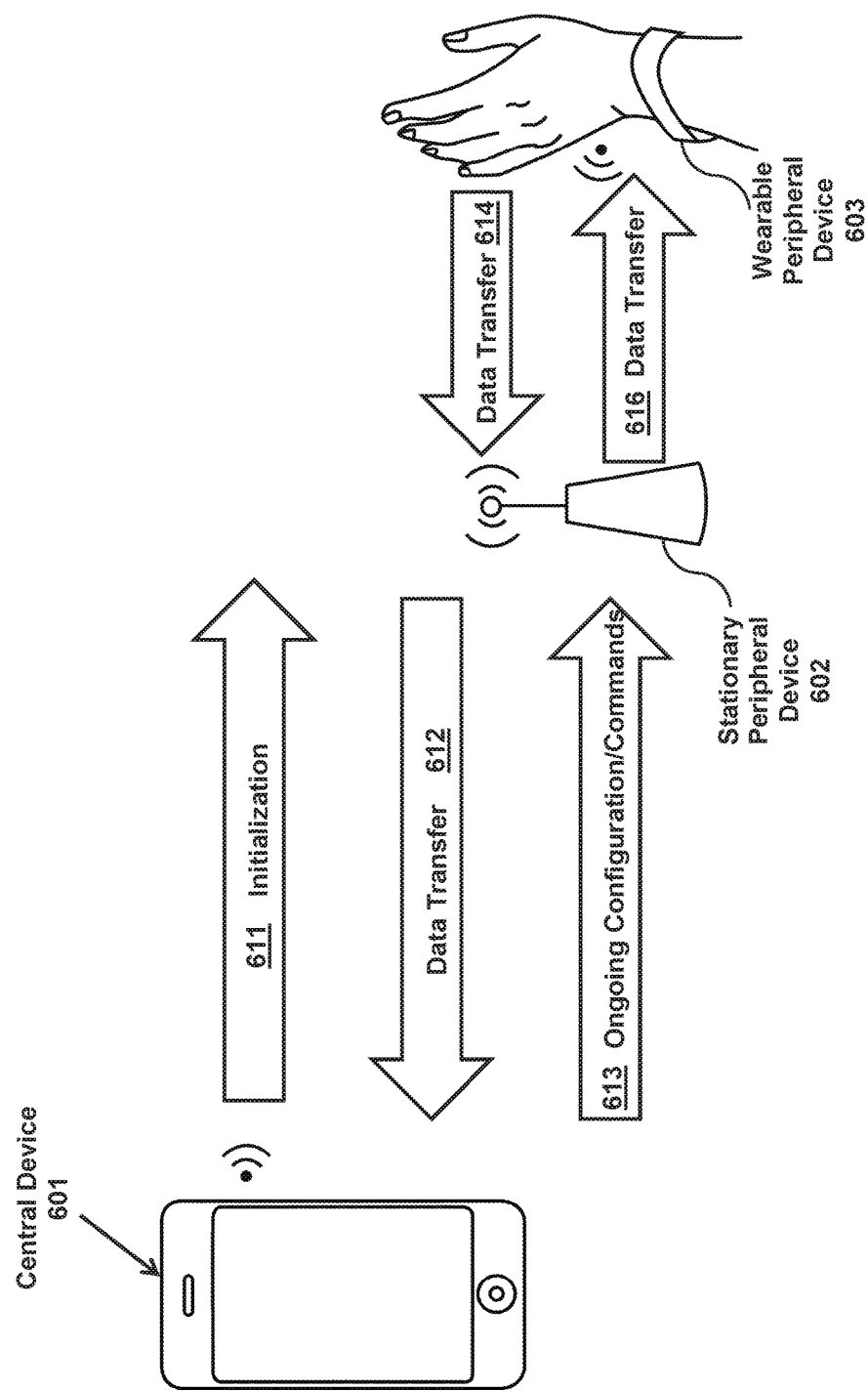
FIG. 6 illustrates an example data flow between a central device, a stationary peripheral device, and a wearable peripheral device in accordance with embodiments of the present techniques.

FIG. 6 illustrates an example data flow between a central device 501 (e.g., a smart phone or mobile device that may be remotely connected via the Internet), a stationary peripheral device 602 (e.g., a custom wireless device), and wearable peripheral device 603 (e.g., a smart band). Additional wearable peripheral devices (not shown) may also be in communication with stationary peripheral device 602.

Central device 601 may initialize 611 communications with stationary peripheral device 602 and wearable peripheral device 603 by establishing a wireless connection with stationary peripheral device 602 and wearable peripheral device 603. Central device 601 may send alarm (or other alert or notification) settings to wearable peripheral device 603 over the established wireless connection. Stationary peripheral device 602 may relay alarm (or other alert or notification) settings to wearable peripheral device 603. The wireless connection may be any of Bluetooth, Wi-Fi, Global System for Mobile Communications (GSM), Code division multiple access (CDMA), Ultra Low Frequency (ULF), or other mobile data protocols.

Wearable peripheral device 603 may perform data transfer 614 to stationary peripheral device 602. Data transfer 614 may include wearable peripheral device 603 transferring sensory data to stationary peripheral device 602 using the established wireless connection. Stationary peripheral device 602 may analyze the sensory data in order to monitor the status of wearable peripheral device 603. Stationary peripheral device 602 may perform data transfer 612 to central device 601. Data transfer 612 may include stationary peripheral device 602 relaying sensory data from data transfer 614 to central device 601. Central device 601 may analyze the sensory data in order to monitor the status of wearable peripheral device 603.

Central device 601 may send ongoing configuration/commands 613 to stationary peripheral device 602. Ongoing configuration/commands 613 may include central device 601 updating alarm (or other alert or notification) settings of wearable peripheral device 603 over the established wireless connection. Ongoing configuration/commands 613 may also include central device 601 issuing alarms (or other alerts or notifications) over the established wireless connection in order to notify or locate the wearer of wearable peripheral device 603.

Stationary peripheral device 602 may perform data transfer 616 to wearable peripheral device 603. Data transfer 616 may include stationary peripheral device 602 relaying ongoing configuration/commands 613 to wearable peripheral device 603.

A localizing network configuration includes may include a central device, a plurality of stationary peripheral devices, and one or more carryable or wearable peripheral devices. In the localizing network configuration, the plurality of stationary peripheral devices monitor the one or more carryable or wearable peripheral devices and relay information to one another and/or to the central device. The localizing network configuration may be useful for tracking of individuals (e.g., children) within a home or other building over the Internet, for example, when the home or building is larger than the range of a single stationary peripheral device. In the localizing network configuration, communication may occur between the central device and peripheral devices, between stationary peripheral devices (to extend range of network communication), from stationary peripheral devices and carryable or wearable peripheral devices to (extend range of network communication), and from carryable or wearable peripheral devices to stationary peripheral devices.

Figure 7:
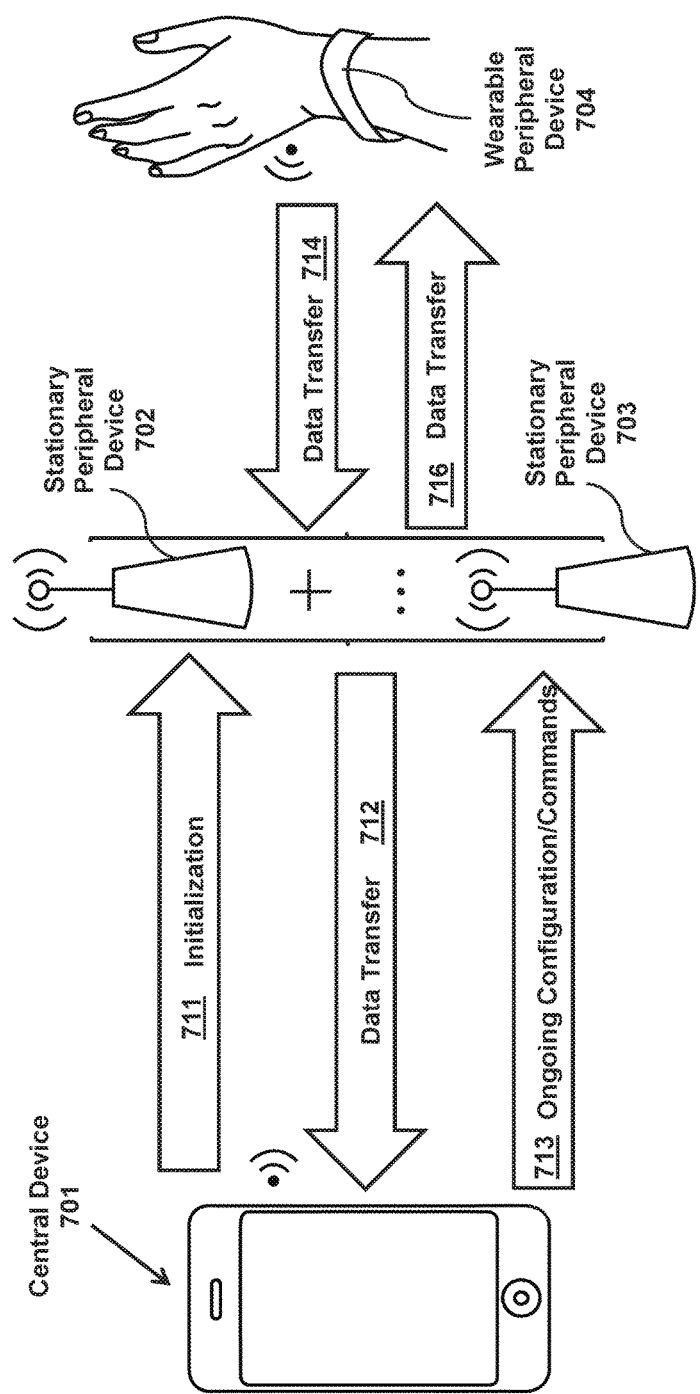
FIG. 7 illustrates an example data flow between a central device, multiple stationary peripheral devices, and a wearable peripheral device in accordance with embodiments of the present techniques.

FIG. 7 illustrates an example data flow between central device 701 (e.g., a smart phone or mobile device that may be remotely connected via the Internet), stationary peripheral devices 702 and 703 (e.g., customer wireless devices), and wearable peripheral device 704 (e.g., a smart band).

Stationary peripheral devices 702 and 703 may establish a wireless connection between one another (and any other stationary peripheral devices) forming a localizing network. The locations of stationary peripheral devices 702 and 703 (and any other stationary peripheral devices) may be known (and pre-programmed) such that stationary peripheral devices 702 and 703 (and any other stationary peripheral devices) may be used for triangulation using established wireless connection. The wireless connection may be any of Bluetooth, Wi-Fi, Global System for Mobile Communications (GSM), Code division multiple access (CDMA), Ultra Low Frequency (ULF), or other mobile data protocols.

Central device 701 may initialize 711 communications with stationary peripheral devices 702 and 703 (and any other stationary peripheral devices included in the localizing network) by establishing a wireless connection with the localizing network and wearable peripheral device 704. Central device 701 may send alarm (or other alert or notification) settings to wearable peripheral device 704 over the established wireless connection. A stationary peripheral device within the localizing network may relay alarm (or other alert or notification) settings to wearable peripheral device 704.

Wearable peripheral device 704 may perform data transfer 714 to a stationary peripheral device in the localizing network. Data transfer 714 may include wearable peripheral device 703 transferring sensory data to the stationary peripheral device (e.g., 702 or 703) in the localizing network using the established wireless connection. The stationary peripheral device may transmit data and create a matrix of RSSI data on a central device in order to monitor the status of wearable peripheral device 704 (and may also perform some data analysis). The stationary peripheral device 702 may perform data transfer 712 to central device 701. Data transfer 712 may include the stationary peripheral device relaying sensory data from data transfer 714 to central device 701.

Central device 701 may analyze the sensory data in order to monitor the status of wearable peripheral device 704.

Central device 701 may send ongoing configuration/commands 713 to a stationary peripheral device (e.g., 702 or 703) in the localizing network. Ongoing configuration/commands 713 may include central device 701 updating alarm (or other alert or notification) settings of wearable peripheral device 704 over the established wireless connection. Ongoing configuration/commands 713 may also include central device 701 issuing alarms (or other alerts or notifications) over the established wireless connection in order to notify or locate the wearer of wearable peripheral device 704.

The stationary peripheral device may perform data transfer 716 to wearable peripheral device 704. Data transfer 716 may include the stationary peripheral device relaying ongoing configuration/commands 713 to wearable peripheral device 704.

Various different configurations and numbers of central devices, stationary peripheral devices, and carryable or wearable peripheral devices have been described for monitoring dependent individuals. However, other arrangements and groupings of one or more central devices and one or more carryable or wearable peripheral devices and potentially also one or more stationary peripheral devices are also possible to facilitate monitoring of dependent individuals. Devices may be flexibly arranged to meet the needs for virtually any specified monitoring environment.

To protect privacy and security, in some embodiments, the devices in the illustrated system may cryptographically authenticate themselves to one another. Some embodiments may use an asymmetric encryption scheme, like RSA or DAS, in which two keys (the key pair) are generated and linked to one another, such that a message encrypted with one key can be decrypted with another key (but with the first key remaining unknown to the holder of the second key, in some embodiments). Or, in some embodiments, each device may store in memory a shared, factory-set random string and the string may be "xor'ed" with messages to encrypt data.

In some embodiments, firmware of the peripheral device may store a unique, factory-set decryption key. The corresponding encryption key that matches the decryption key may be stored on a remote server, e.g., in a database, in association with a serial number of the peripheral device and a value indicating if the key has been used or is associated with an account yet. In some cases, the keys are set at the factory and do not change.

To authenticate a central device and peripheral device pair (and allow the central device to access data broadcast by the peripheral device), upon purchasing a new peripheral device, the user may navigate to a menu in a native application in the central device to configure the user's account. In this menu, the user may enter a serial number of the peripheral device, and the application may send the serial number to the remote server, which may retrieve the corresponding key from the database. In some cases, the server may maintain a record in the database indicative of whether the serial number is associated with a device that has already been claimed and block, or require additional authentication credentials, when a device has already been claimed to prevent third parties who later see the serial number from obtaining a key.

In some cases, before sending the key to the native application, the server may authenticate the peripheral device via the native application. To this end, the server may first encrypt a random string (e.g., a pseudo random string, or other difficult to predict string) with an encryption key paired to the decryption key on the peripheral device, e.g., such that only the peripheral device has access to a key to decrypt the string. The encrypted string may be sent to the native application, which may relay the encrypted string to the peripheral device. The peripheral device may decrypt the encrypted message and send the decrypted string (or a value based on the decrypted string sufficient to prove decryption) back to the server via the native application to confirm that the peripheral device has access to the corresponding key. Upon verifying this, the server may send the encryption key to the native application needed to communicate with the new peripheral device. The server may then update a record in memory indicating the device has been paired, and the native application may store the key in persistent memory, e.g., in association with a network address, like a MAC address of the peripheral device.

When exchanging data, the peripheral device and central device may then encrypt their data with their respective keys, and the other device may use its respective key to decrypt the data. As a result, privacy of users may be protected when exchanging sensitive data about dependent individuals.

In some cases, positioning may be determined based on the techniques described in U.S. Provisional Patent Application 62/384,448, which is incorporated by reference.

In some embodiments, the above-described wearable device (or other wearable computing devices) may include an electronic lock configured to lock and unlock the wearable device, such as a lock described below with reference to FIGS. 8-22. In some cases, the wearable device may be manually locked and electronically unlocked (For example, to prevent accidental or unauthorized unlocking), or vice versa. Manually locking (or unlocking) may store potential energy in the lock (e.g., by biasing a resilient member), and that stored energy may be released and harnessed to effectual the reverse operation. The reverse operation may be triggered electronically (e.g., via a remote wireless control or authorization signal sent form one of the devices described above associated with a caregiver). Thus, at least one of locking or unlocking may release the stored potential energy imparted with the manual operation, and this stored energy may conserve electrical power used to effectuate the reverse operation, thereby extending battery life of the wearable device.

For example, where the locking mechanism is used with a wristband, the locking mechanism may be locked manually by pressing a lock button (as described herein), and cannot be unlocked manually to help prevent accidental or unauthorized unlocking of the wristband. The wearable device may be unlocked electronically via an actuator (as described in the example below). The locking mechanism described herein may be used in other applications. For example, the locking mechanism may be used to lock/unlock other wearable devices (e.g., watches, bracelets bands, necklaces, and/or other wearable devices). It should be noted that use of the locking mechanism described herein is not to be limited to use in monitoring system (wearable or not) (which is not to imply that other features are limiting). Use of the locking mechanism in different applications is consistent with the techniques described here. In some cases, the locking mechanism may be used to lock/unlock items that are not wearable. For example, furniture (e.g., dressers, lockers, cabinets, and/or other furniture items), doors, windows, cars, seat belts, car seats, or other items.

In some embodiments, the above-described wearable device may include a panic button or a touch screen to allow the user (person wearing the device) to communicate or interact with the device. With traditional techniques, this feature might add significantly to the cost of the device. However, some embodiments provide these features at relatively low expense, in a battery friendly way, for example with sensors that serve dual purposes. Some embodiments may provide for communicating between a wearable or Internet-of-thing (IoT) device to a parent network or central device or other devices through a sensor rather than using a more expensive, power hungry interface to connect devices.

Figure 8:
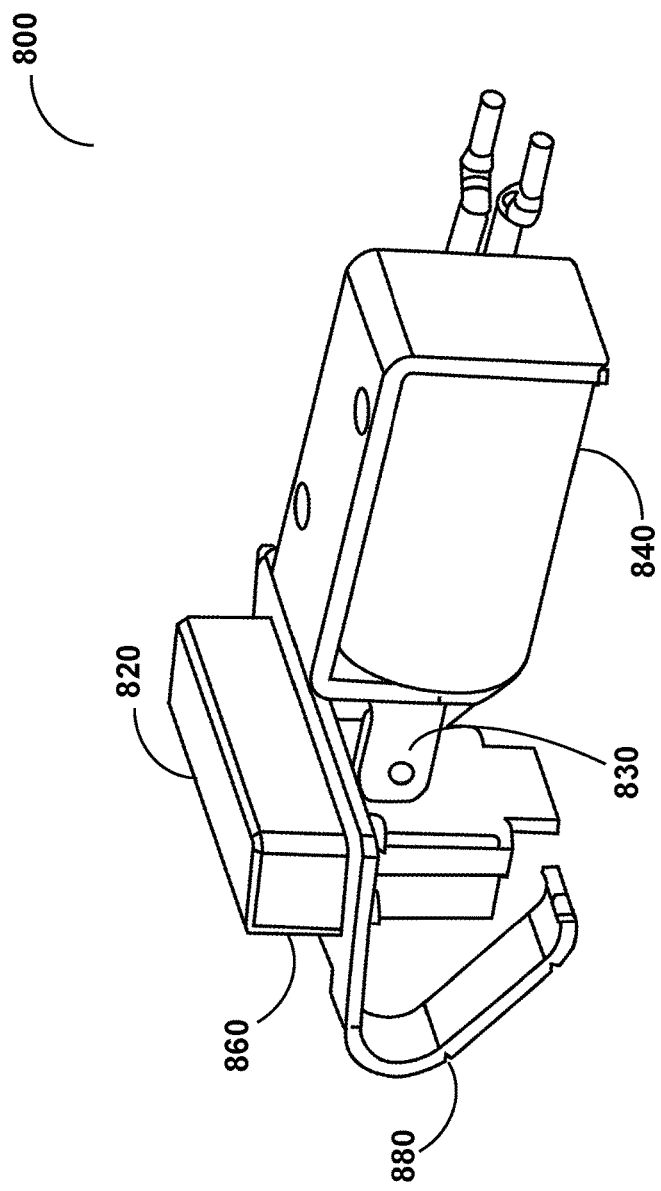
FIG. 8 illustrates an example electronic lock in accordance with embodiments of the present techniques.

FIG. 8 illustrates a locking mechanism 800 that may mitigate some of the above-described issues, as well as, or in the alternative, provide other benefits described below. In some embodiments, locking mechanism 800 is configured to lock/unlock a wearable device, such as the wearable device described above. Locking mechanism 800 controls closure of the wearable device in some cases. For example, in cases where the wearable device is a band, locking mechanism 800 controls the closure of the band. Locking mechanism 800 may be an integral part of the wearable device in some cases, or the locking mechanism may include separate parts assembled into the wearable device. For example, locking mechanism 800 may be located in the same housing where the processors, sensors, storage media, user interfaces (described above) are located. In other cases, locking mechanism may be connected to the wearable device via different connections (e.g., band, welds, rivets, clips, screws, bolts, etc.) For example, in some embodiments, locking mechanism may be located in a different housing that includes processors, sensors, storage media, user interfaces and that can be attached or detached from the wearable device (e.g., the locking mechanism may be part of a band to which a monitoring system, such as the one described above, can be added to, or locking mechanism 800 maybe an add-on to a wearable device having a monitoring system). In some cases, locking mechanism 800 may be connected to the wearable device permanently of semi-permanently. For example, in some cases, once locking mechanism 800 is connected to the wearable device it cannot be detached from it. Or in other cases, once the locking mechanism is unlocked it can be detached from the wearable device.

In some embodiments, locking mechanism 800 may be locked manually using a lock button and unlocked electronically using an actuator, or vice versa. In some embodiments, locking mechanism 800 includes a lock button 820 and an actuator 840. Manual locking of the locking mechanism may be done by pushing button 820, turning a nob, or securing a closure. Other manual or mechanical locks are consistent with the techniques described here. In some cases, locking the locking mechanism may be done manually or electronically. For example, a first step is manual (push a button, or turn a nob for example) and the second step is electronic via an electronic control of an actuator (e.g., actuator 840) to finish the locking action. In some cases, locking may consume more energy the unlocking, so to preserve power on a battery on the band, locking may be effectuated manually while unlocking is executed at least in party electronically (e.g., a release may be effectuated electronically, while further manual interaction removes the band)

In some embodiments, electronic unlocking of locking mechanism 800 may be done by electronic control of actuator 840 (wired or wireless) thereby controlling movement of a stopper 830 that keeps the locking mechanism in a locked position (e.g., control of a movement of a pin in and out of a hole). In some cases, actuator 840 may be controlled mechanically, electronically, or through software. In some cases, actuator 840 may be electronically controlled with a controller located in the wearable device via commands sent over a network (e.g., with monitoring device described above). In some embodiments, actuator 840 may be controlled by authentication (e.g., a code, a security token, a password, or a biometric authentication entered into a user interface on the wearable device). Control by authentication may be done in two steps in some cases, first step being authentication and the second step being accessing control of the actuator. For example, to unlock a wearable device from a control device (e.g., a mobile phone) a user is prompted to enter a password to access control of the actuator, and once authenticated, the user can access control of the actuator from the mobile phone. In other cases, authentication results in control of the actuator (e.g., once a password is entered the wearable device is unlocked). This could be done from an interface on the wearable device or remotely from a control device over a network or via wired connection.

In some cases, the wearable device may be configured to access stored authentication information on a personal digital assistant (PDA), a computer, or smartphone by using wireless communication. For example, by using infrared, Wi-Fi, Global System for Mobile Communications (GSM), Code division multiple access (CDMA), Ultra Low Frequency (ULF), Bluetooth, or Near-field communication (NFC) data transfer methods to control the actuator. In some embodiments, a radio-frequency identification (RFID) tag and a tag reader may be used to control the actuator. For example, a tag may be placed in the wearable device, and a tag reader may be placed in the control/monitoring device. Once the tag reader detects the tag the actuator may be automatically controlled to unlock the locking mechanism. It should be noted that other sensors and sensor readers may be considered and are consistent with the techniques described here.

In operation, actuator 840 translates energy received to movement (e.g., of stopper) in response to a control signal. In some cases, actuator 840 may be powered by electric current (e.g., from a battery). Other sources of energy may be considered. Examples of actuators that may be suitable include one or more of a solenoid, a DC motor, an electromagnetic coil, a rotor, a harmonic drive, a micro linear pusher, or a piezo actuator.

In some embodiments, actuator 840 is configured to convert electrical energy or other forms of energy (e.g., from a battery, hydraulic fluid pressure, pneumatic pressure, or other sources of energy) into movement (linear translation, rotation, or combinations thereof). For example, pushing or pulling stopper 830. In some cases, actuator 840 may operate with a direct current (DC) voltage and may be controlled using a transistor (e.g., a metal-oxide-semiconductor field-effect transistor MOSFET). In some cases, alternative current (AC) voltage may be used along with rectifiers. In some embodiments, the actuator may be one or more of an electromagnetic coil, a rotating motor, a solenoid, a DC motor, a harmonic drive, a micro linear pusher, a piezo actuator, and/or other actuators. Dimensions of the actuator may vary between 2-6 mm in width and 10-24 mm in length in some embodiments.

Figure 13:
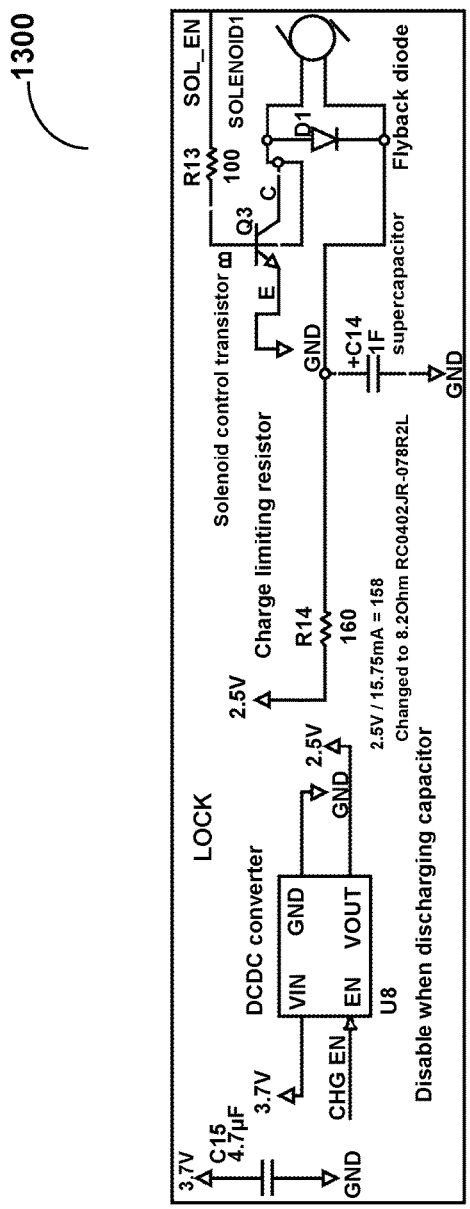
FIG. 13 illustrates an example of a control ciruit in accordance with embodiments of the present techniques.

In some embodiments, actuator 840 may be a linear solenoid configured to control linear movement of stopper 830 (e.g., in and out of slot 888). In some cases, the solenoid is a pull-type solenoid configured to pull stopper 830 towards itself when energized. This is may be advantageous since the solenoid needs to be energized only when the locking mechanism is being unlocked (though not all embodiments afford this advantage, which is not to suggest that other features may not also be varied). In other cases, the solenoid may be a push-type solenoid configured to push the stopper away from itself when energized. In some cases, to prevent high back voltages from damaging the switching device an electrical protection in the form of a flyback diode, a Zener diode, or a varistor may be used across the solenoid coil. FIG. 13 illustrates an example of a control circuit 1300 for solenoid 840. In some cases, circuit 1300 may include a direct current converter (DC-DC converter) for example to convert a 3.7V from a battery to a 2.5V. In some cases, circuit 1300 may include a charge limiting resistor, a supercapacitor, a solenoid control resistor, and a flyback diode to prevent high back voltage when current is interrupted.

Figure 9:
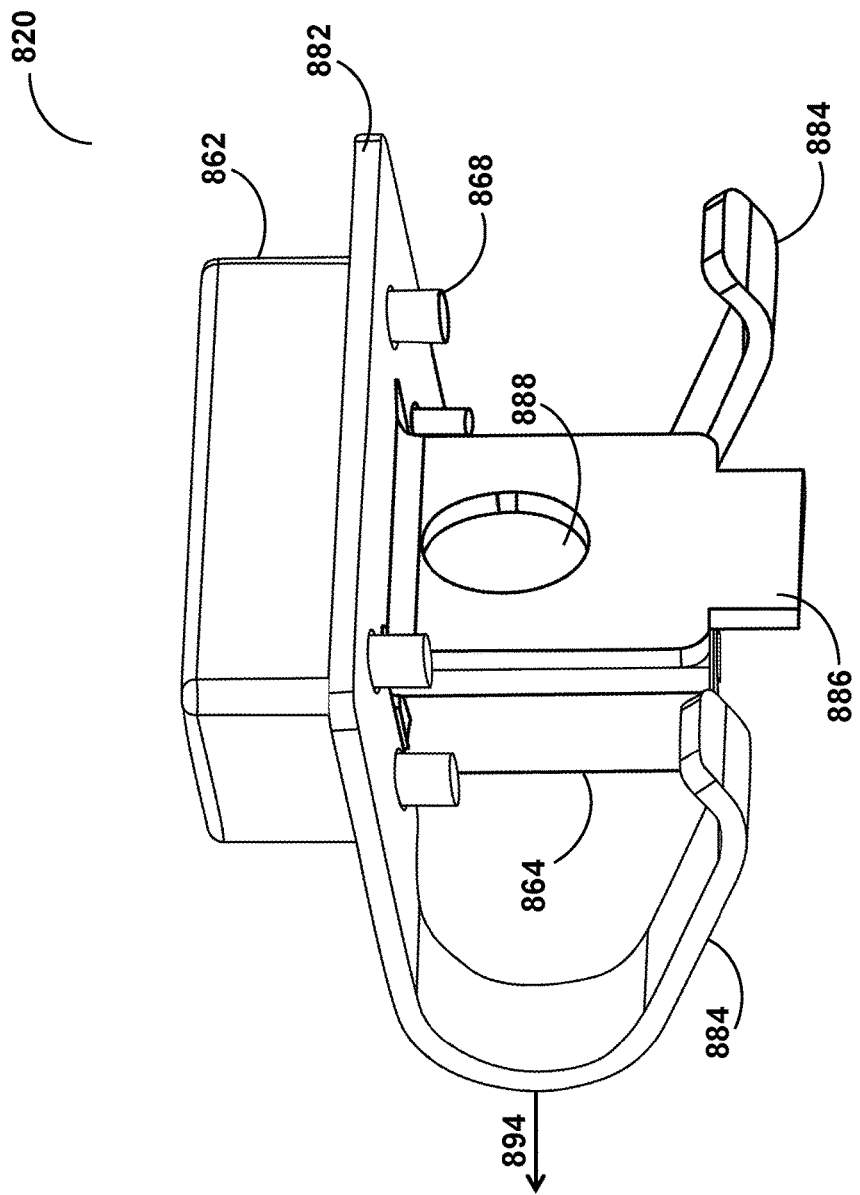
FIGS. 9-10 illustrate views of an example electronic lock in accordance with embodiments of the present techniques.
Figure 10:
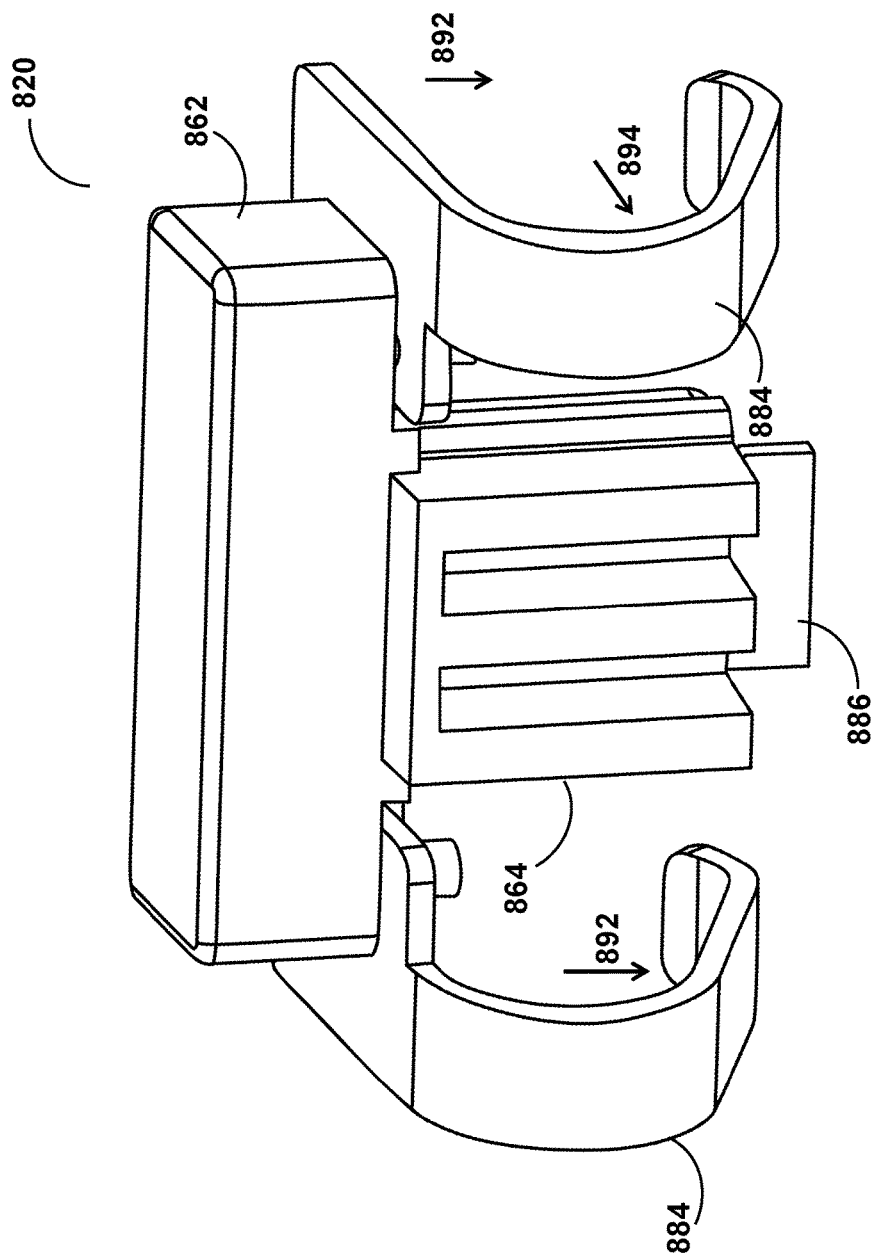

In some embodiments, lock button 820 is configured to mechanically lock/unlock the locking mechanism and thereby locking/unlocking the wearable device. In some cases, lock button 820 includes a body 860 and a spring 880. For example, to lock the wearable device a pressure is applied on body 860 of the lock button 820 (e.g., lock button may be manually pushed down to lock the wearable device). The pressure may result in compressing spring 880 thereby moving the locking mechanism 800 into a locked position and engaging stopper 830 that prevents the locking mechanism from moving from the locked position. The wearable device may be unlocked by moving stopper 830 out of the way with actuator 840. FIGS. 9-10 illustrate views of an example of lock button 820 according to some embodiments.

In some embodiments, body 860 has "T" shape with a top portion 862 being approximately perpendicularly connected to element 864 of body 860. In some cases, body 860 is connected to the upper portion of spring 880 such that top portion 862 sits on the upper portion of spring 880, and such that element 864 is parallel to support portion 886 of spring 880. In some embodiments, top portion 862 may have a rectangular prism shape with one or more pegs 868 configured to connect body 860 to spring 880. Other shapes for top portion 862 may be considered (e.g., cubic, cylindrical, triangular shape, etc.) In some embodiments, portion 862 may protrude from an aperture or a hole in the wearable device, such that the user may press the locking button 820 by pushing down portion 862. In other cases, portion 862 may be located under a housing in the wearable device, and can only be accessible through an aperture or hole (e.g., using a small object to press button 820 down) to prevent accidental locking or unlocking of the wearable device. In some embodiments, body 860 may be injected molded from a plastic material. This is expected to lower the cost of manufacturing. It should be noted that other materials may be considered (e.g., aluminum, steel, copper, etc.) In other cases, top portion 862 and element 864 are manufactured separately and connected together to form body 860 (e.g., with screws, glue, bolts, etc.).

In some embodiments, body 860 has one degree of freedom relative to a housing of the illustrated assembly of FIG. 8. For instance, a guide member may interface with a complementary member in the housing (e.g., with a slot and tab), and the body 860 may translate linearly into and out of the housing when pressed and released. In some cases, this direction of movement may be orthogonal (e.g., within 15 degrees of exactly orthogonal) to a direction of movement of the actuator 840. In some cases, the actuator 840 includes a compression spring disposed around a moving member that biases the moving member in an extended position. When unlocking, this spring may be further compressed. Thus, no energy is expended, in some embodiments, in locking or keeping the device in a locked state.

In some embodiments, a distal portion of spring 880 adjacent button 820 is configured to move with lock button 820 into a locked position, by resiliently deforming the spring 880 (e.g., placing an outer surface of the bend in tension and an inner surface in compression) under a pressure applied to the lock button 820. In some embodiments, another distal portion of spring 880 is connected to body 860 such that when pressure is applied to body 860, spring 880 is compressed. Spring 880 and body 860 may be connected by screws, pegs, fasteners, glue, etc. In the examples shown in FIGS. 8-10, spring 880 includes one or more holes configured to receive one or more pegs of body 860. In some cases, spring 880 comprises an upper portion 882, arms 884, and a support portion 886. In some cases, upper portion 882 and support portion 886 are perpendicularly connected to form an "L" shape (e.g., approximately perpendicular). Arms 884 may be connected to opposite sides of upper portion 882 horizontally. In some embodiments, upper portion 882 and support portion 886 have relatively fixed dimension (do not compress under pressure) while arms 884 compress to provide upward and downward movement to lock button 820.

In some embodiments, arms 884 store mechanical energy resulting from the compression load and get shorter as the load is applied to the body 860. In some cases, when arms 884 are compressed down they may exert an opposing force approximately proportional to their change in length. In some embodiments, arms 884 may have a 1-4 mm change in distance between the ends of the arms under pressure. For example, in FIG. 10 arrow 892 shows compression movement and arrow 894 shows bending movement of arms 884 as a result of a pressure 896 applied to body 860. In operation, when arms 884 are compressed stopper 830 is inserted into slot 888 of support portion 886 locking the button down, and when stopper 830 is moved out of the way (e.g., by electronic actuation) arms 884 return to their original state and original length thereby unlocking the lock button. In some embodiments, arms 884 may be made out of a piece of metal bent into a bow shape. In other cases, arms 884 may be made out of two angled pieces of metal connected together. In some embodiments, arms 884 may be flat springs, coil springs, or serpentine springs, torsion springs, V-springs, rubber bands, etc.

In some embodiments, spring 880 may be made from a flexible bendable material having an internal resistance such that the material may be deformed under force (e.g., pressure from pressing lock button 820) but restores to its original state when the force is no longer applied (e.g., spring steel, phosphor bronze, titanium, or beryllium copper). In some cases spring 880 may be made of a mix of materials having same or different elasticity properties. In other cases, parts of spring 880 may be made out a rigid material (e.g., upper portion 882 and support portion 886) and other parts may be made out of an elastic material (e.g., arms 884). In some embodiments, spring 880 may be bent or stamped from a single sheet of metal (for relatively inexpensive but reliable manufacturing). In other cases, spring 880 may be made out of different parts that connected together (e.g., welded, glued, screwed, bolted, etc.)

Figure 11:
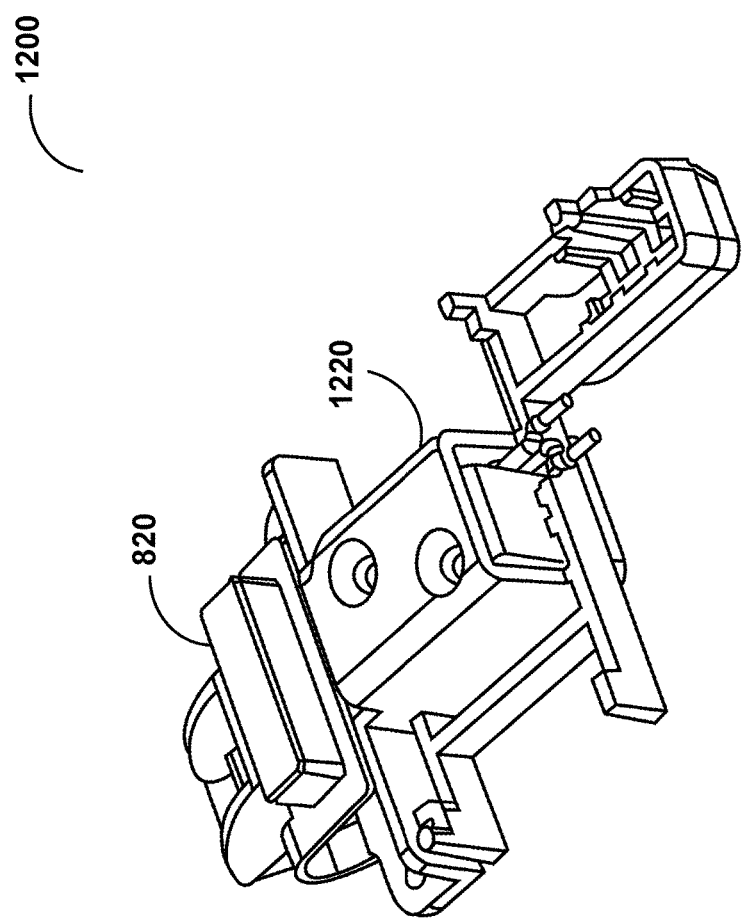
FIGS. 11-12 illustrates an example electronic lock assembly in accordance with embodiments of the present techniques.
Figure 12:
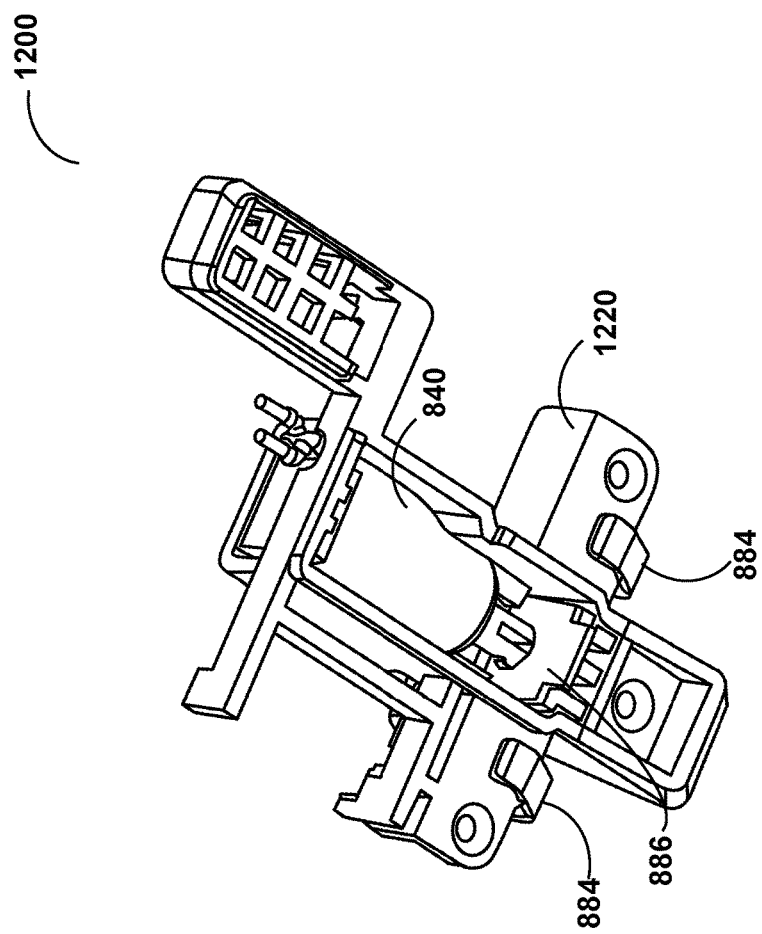

In some embodiments, locking mechanism 800 described above may be housed in a carriage within a housing (e.g., the housing of the wearable device described above). FIGS. 11-12 illustrate an example of locking mechanism assembly 1200 according to some embodiments. FIG. 11 shows a top view of carriage 1220 and FIG. 12 shows a bottom view of the carriage. Carriage 1220 may be configured to house other element of the wearable device, such as controllers, sensors, electronics, user interfaces, memory, etc.

FIGS. 14A-C illustrate a top view and cross sections views respectively of an example of locking mechanism. In the embodiment of FIGS. 14A-C, the locking mechanism includes a solenoid 1480 having a shaft 1430 that pins the manual lock button 1420 in a locked position. When lock button 1420 is pressed down towards slot 1486, springs 1484 are compressed and shaft 1430 pins the button down into a locked position.

Figure 15C:
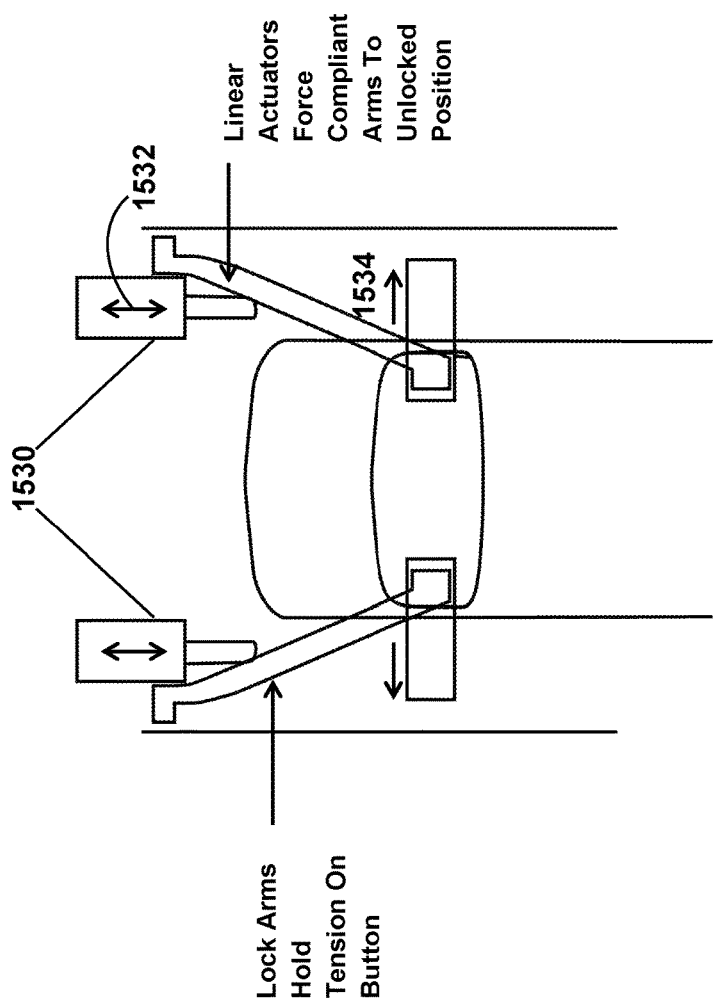
FIGS. 15 A-C illustrate cross sections views of examples of electronic locks in accordance with embodiments of the present techniques.

FIGS. 15 A-B illustrate an example of a locking mechanism according to some embodiments. FIG. 15 A illustrates a cross view of locking mechanism 1500 in an unlocked position, and FIG. 15 B illustrates a cross view of locking mechanism 1500 in a locked position. Locking mechanism 1500 includes locking arms 1530 configured to hold locking button 1520 into a locked position when the button is pressed down (movement shown by the arrow in FIGS. 15A). Button 1520 includes grooves 1525 configured to receive arms 1530 when the locking mechanism is in a locked position. Springs 1528 are configured to facilitate movement of the arms into the grooves. Springs 1525 are de-compressed when the button is in the locked position and compressed when the button is in an unlocked position. In this embodiments, locking mechanism 1500 includes linear actuators 1530 (FIG. 15C) configured to unlock the locking mechanism by applying a linear force (arrows 1532) on the arms to push them back (arrows 1534) from the grooves into the unlocked position.

Figure 16:
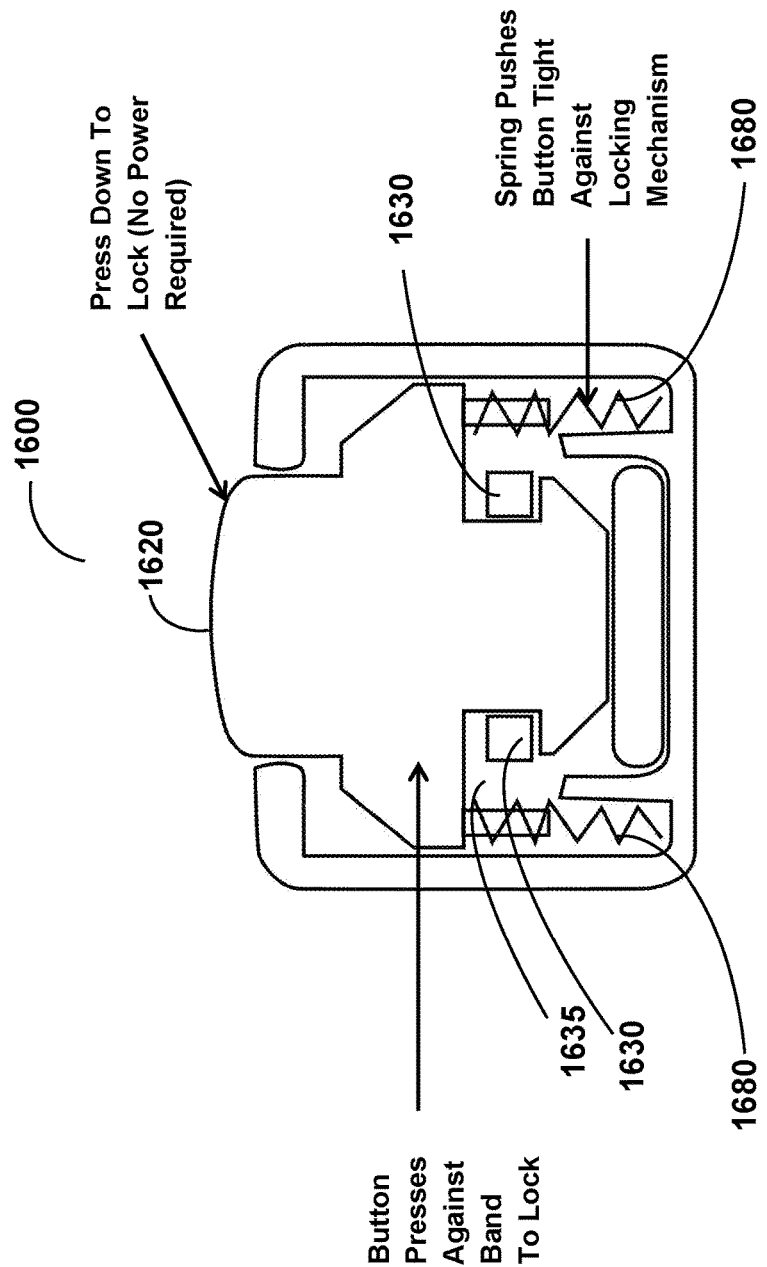
FIG. 16 illustrates cross section views of example of electronic locks in accordance with embodiments of the present techniques.
Figure 17:
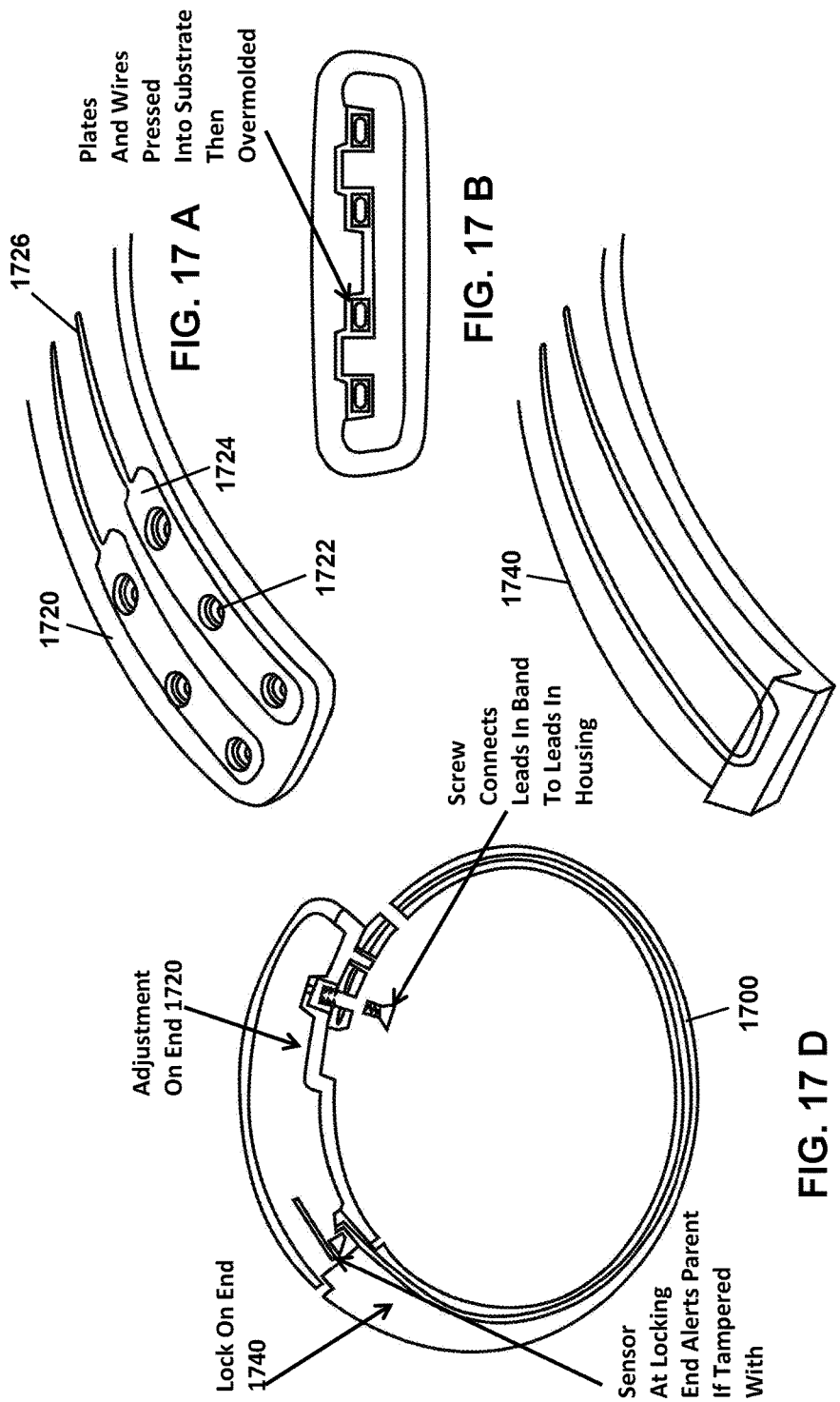
FIGS. 17 A-D illustrate an example wearable device in accordance with embodiments of the present techniques.
Figure 18:
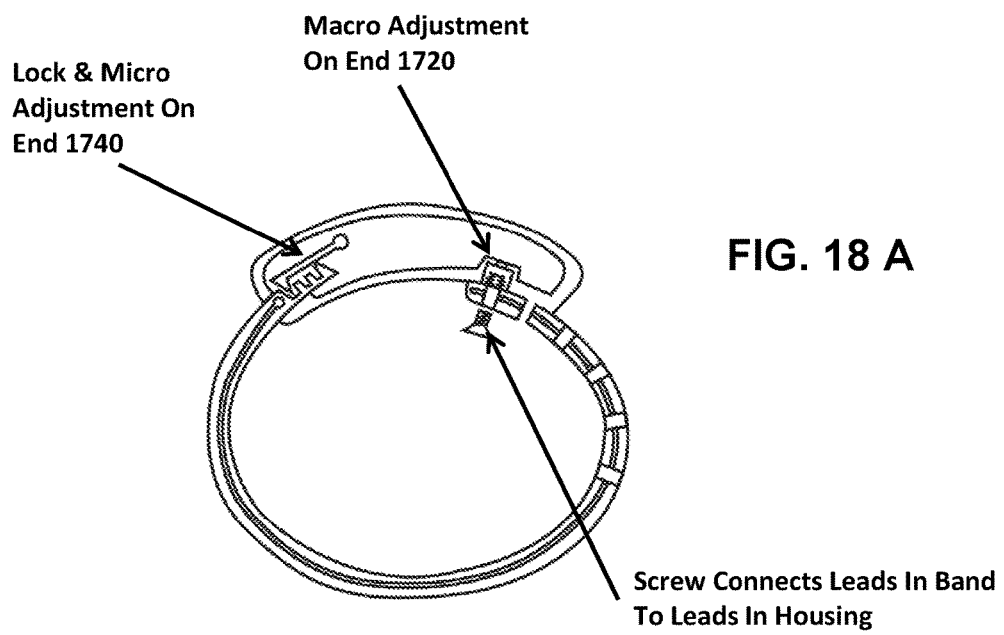
FIGS. 18 A-B illustrate an example wearable device in accordance with embodiments of the present techniques.
Figure 18:
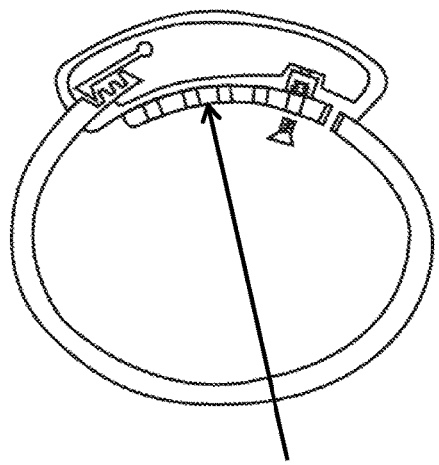
Figure 18:
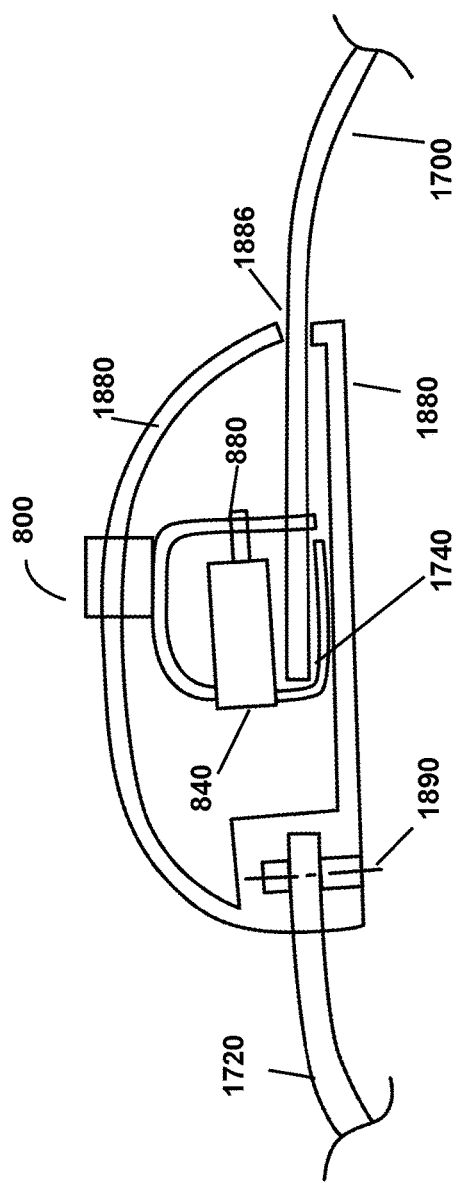

FIG. 16 illustrates a cross view of a locking mechanism in accordance with some embodiments. Locking mechanism 1600 includes button 1620 configured to be pressed down into a locked position. When the button in pushed down stoppers 1630 are inserted into slots 1635 and springs 1680 are compressed. The stoppers and the spring keep the button in a locked position. Locking mechanism 1600 may be unlocked by actuating stoppers 1630 back to allow the button to move up.

The present invention may be embodied in other specific forms without departing from its spirit or essential characteristics. For example, some embodiments may allow a user of the wearable device to communicate or interact with the device, providing, for instance, a panic button or a touch screen. With traditional techniques, this feature might add significantly to the cost of the device. However, some embodiments provide these features at relatively low expense, in a battery friendly way, with sensors on the device that serve dual purposes. For instance, some embodiments may include an accelerometer that senses inputs from a child, who may send commands to the device by tapping the wristband, producing sensed accelerations. A variety of inputs may be sensed and acted upon. Some embodiments may allow the child to communicate with the parent device or any other device by allowing the child (user) to tap the device in certain patterns. Some embodiments may support a panic alarm with a tap que, for example.

Some embodiments may allow the user to communicate using a "Morse code" style to a smart device, like the above-described wristband, and then the device may wirelessly send commands to a smartphone, for instance, from any wearable fitted with an accelerometer using tap commands or a tap pad interface. Applications are not limited to tracking individuals. A smart watch, for example, may be told to send a call to voice mail or launch a certain app without looking at the screen simply by tapping a preset command pattern anywhere on the device, or even simply tapping your fingers on a table of the hand wearing the device. Tapping very quickly many times in a row may be programmed to call a certain person without touching anything else. Some embodiments may use tap patterns to connect Internet-of-thing (IoT) devices, rather than using a more expensive, power hungry interface to connect to, for instance, protected wireless networks. A simple tap pattern may be translated to the wireless password and allow more devices to connect without expensive interfaces. Thus, some embodiments may provide for communicating between a wearable or IoT device to a parent network or device using a tap pattern through an accelerometer.

In some embodiments, the monitoring device and locking mechanism described may be used in a wrist band. FIGS. 17A-D illustrate an example of a wrist band 1700 according to some embodiments. In some cases, the band includes embedded wires 1726 and plates 1724 for electrical connectivity with electronics of the wearable device. The plates and wire may be pressed into a substrate and over molded to make the band. In some embodiments, a first end of the band 1720 includes a plurality of holes 1722 electrically connected to the wires 1726 via plates 1724. The holes are used to adjust the size of the band to fit different users. The holes are configured to receive screws (or bolts, or other fasteners) to connect the band to the housing of the monitoring system in some cases. The second end of the band 1740 is configured to be inserted in the housing to fasten the band around the wearer's wrist. Once fastened the locking mechanism is in a locked position. In some cases, the size of the band may be adjusted from the second end of the band as shown in FIGS. 18A-B. In this case, second end includes a plurality of grooves configured to receive a lock to lock the wearable device. It should be noted that other types of bands may be considered and are consistent with the techniques described here.

FIG. 18C illustrates a cross section view of an electronic lock assembly (e.g., electronic lock of FIG. 8) in accordance with some embodiments. Electronic lock 800 is housed in housing 1880. Band 1700 may be adjusted (to fit size of the wearer) from lock end 1740. For example, end 1740 may be inserted in housing 1700 via opening 1886 and locked in a position where the band fits the wearer. For example, as described above end 1740 may include grooves configured to receive the electronic lock. In some cases, end 1720 of the band does not adjust the size of the band (e.g., the band is coupled to the housing via screw 1890 in a hole in the band).

Figure 19:
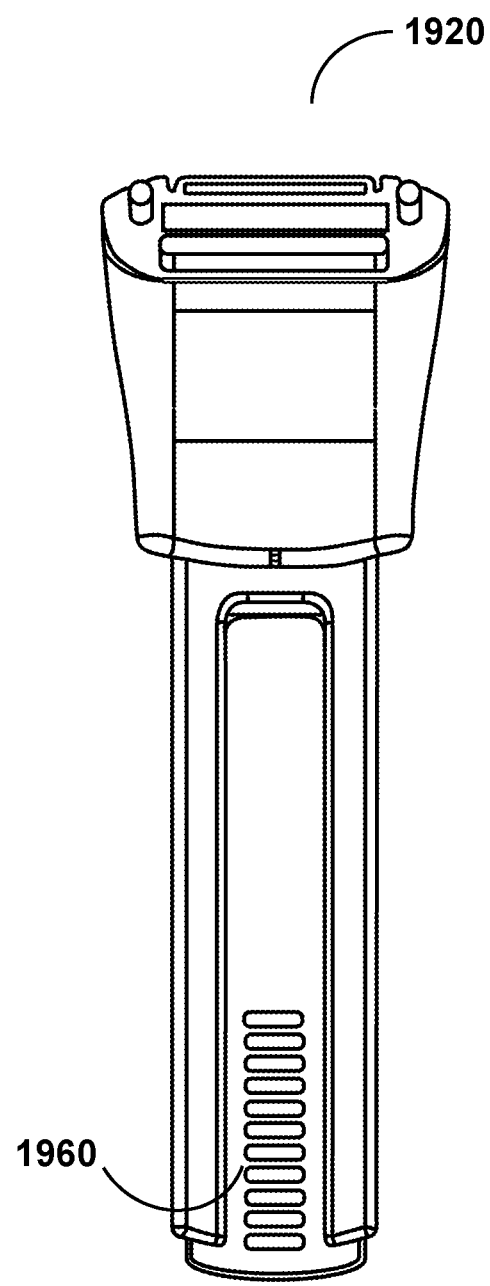
FIGS. 19-21 illustrate a top, front and side view respectively of an example band interface in accordance with embodiments of the present techniques.
Figure 20:
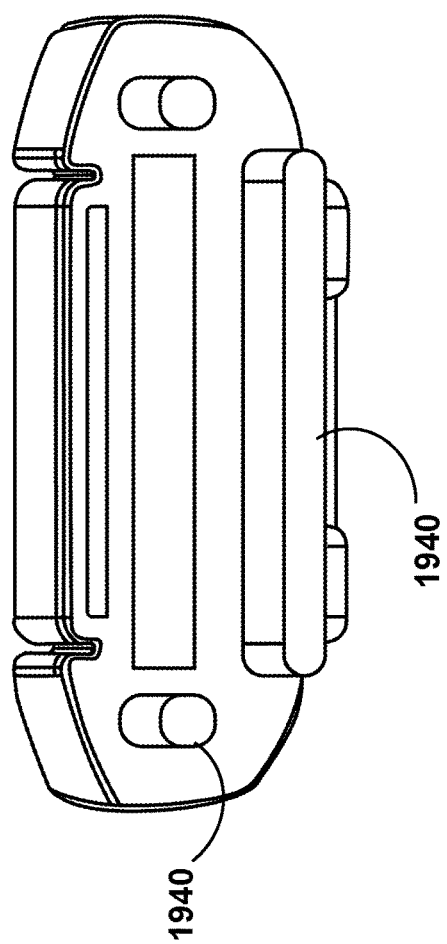
Figure 21:
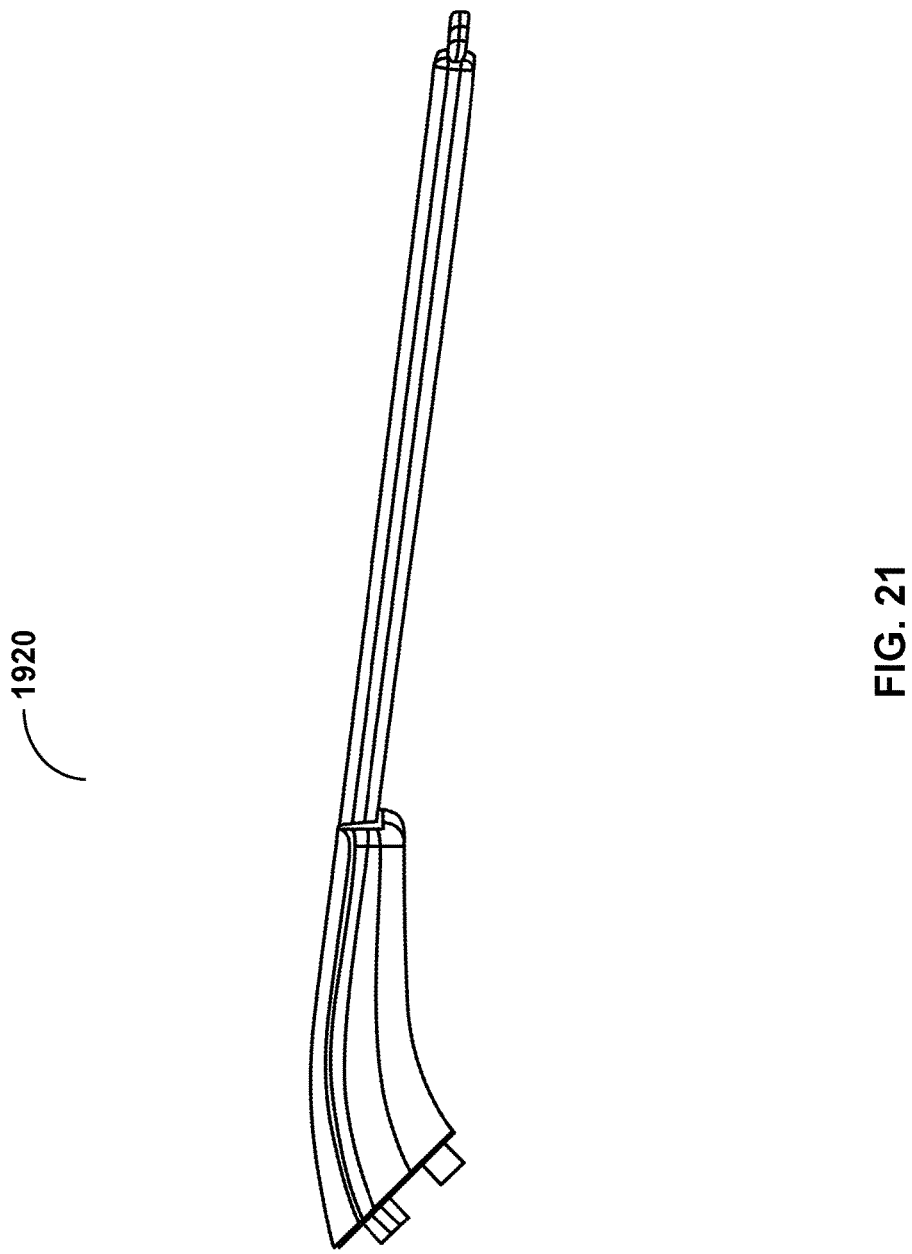

FIGS. 19-21 illustrate an example of a band interface 1920 configured to be used with the monitoring system and the locking mechanism described above. In this example, band interface includes a plurality of protrusions 1940 configured to fit in corresponding slots in the housing of wearable device, and slots 1960 are configured to allow size adjustment of the band.

In some embodiments, various other types of locks may be implemented. For instance, a band may be compressed, e.g., by a threaded bolt that passes through a threaded aperture orthogonal to the band. In some cases, an electronic actuator like those described above may interface with a series of teeth around such a bolt to prevent unthreading and release of the lock, thereby pinching the band in a fixed position.

Figure 22:
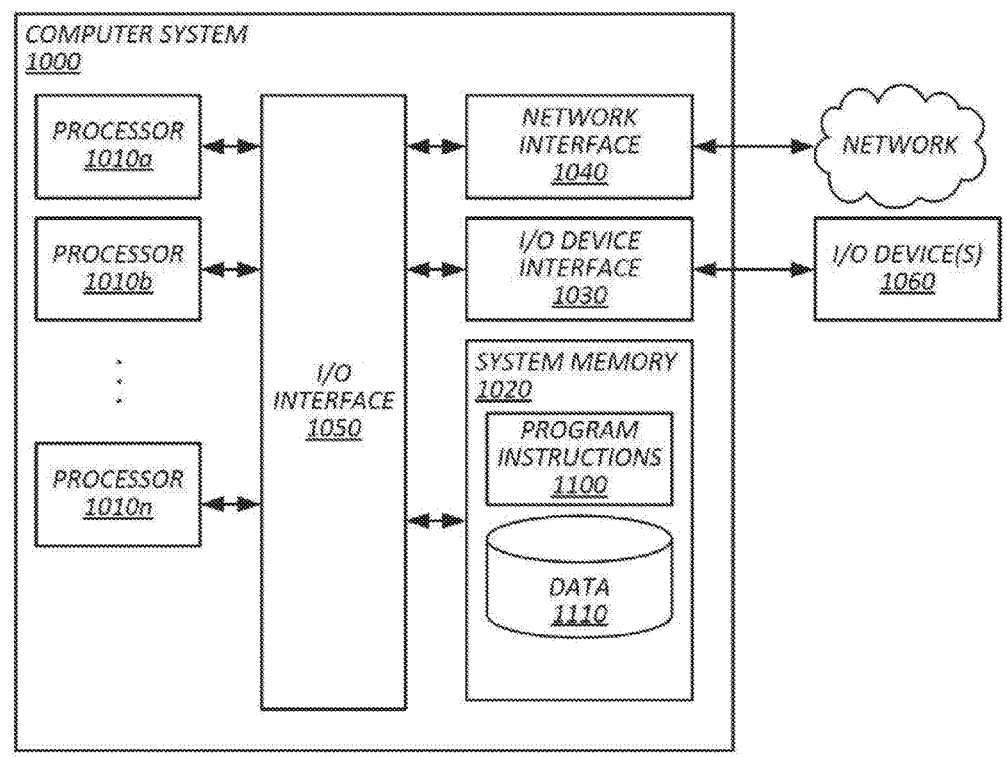
FIG. 22 is a diagram that illustrates an exemplary computing system 1000 in accordance with embodiments of the present techniques.

FIG. 22 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

To mitigate the problems described herein, the applicants had to both invent solutions and, in some cases just as importantly, recognize problems overlooked (or not yet foreseen) by others in the field. Indeed, applicants wish to emphasize the difficulty of recognizing those problems that are nascent and will become much more apparent in the future should trends in industry continue as applicants expect. Further, because multiple problems are addressed, it should be understood that some embodiments are problem-specific, and not all embodiments address every problem with traditional systems described herein or provide every benefit described herein. That said, solutions to many of these problems are described above.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

The present inventions may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium (which may be distributed among multiple computing devices, with different computing devices having different subsets of the medium, e.g., in a distributed application).

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more."

The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. It should also be noted that "information indicating the location of the moveable device with respect to a central unit" does not require the information to include or be based on the location of the central unit when the information is a signal received by the central unit, as things like signal strength can indicate location. Also "the location of the peripheral device breaching the location indicator threshold" need not be detected at the moment of breach. It is enough to determine it is beyond the threshold.

The present techniques will be better understood with reference to the following enumerated embodiments:

1. A locking mechanism for a wearable child-monitor system, the locking mechanism comprising: a button assembly; a spring assembly coupled to the button assembly, the spring assembly comprising: two bent arms configured to compress under a force applied to the button assembly; and an aperture configured to receive a stopping element when the locking mechanism is in a locked position; an actuator configured to electronically control movement of the stopping element in and out of the aperture; and a control circuit comprising: a tangible non-transitory machine readable media storing instructions that when executed by one or more processors of the control unit effectuate operations comprising: receiving a request to unlock the locking mechanism; sending a request for authentication; receiving authentication information; and controlling the actuator to move the stopping element from the locked position.
2. The locking mechanism of embodiment 1, further comprising: an electrical circuit continuity sensor configured to indicate a state of the locking mechanism.
3. The locking mechanism of any of embodiments 1-2, wherein the operations further comprise sending an alert signal to a monitoring device in response to the continuity sensor indicating an unlocked state.
4. The locking mechanism of any of embodiments 1-3, wherein the operations further comprising: receiving a wireless signal indicating presence of a monitoring device; and unlocking the locking mechanism in response to received wireless signal.
5. The locking mechanism of any of embodiments 1-4 comprising an RFID tag reader, wherein the operations further comprise: detecting with the tag reader a tag located in a monitoring device; and unlocking the locking mechanism in response to the tag reader detecting the tag
6. The locking mechanism of any of embodiments 1-5, wherein the two arms are coil springs configured to compress when the locking mechanism is in the locked position and return to an initial state when the locking mechanism is unlocked.
7. The locking mechanism of any of embodiments 1-6, wherein the actuator is a linear solenoid.
8. The locking mechanism of embodiment 7, wherein the linear solenoid is a pull solenoid configured to pull the stopping element out of the aperture to unlock the locking mechanism.
9. The locking mechanism of any of embodiments 1-7, wherein the actuator is a harmonic drive.
10. The locking mechanism of any of embodiments 1-7, further comprising: a wearable device associated with a user, the wearable device comprising one or more sensors configured to indicate location of the wearable device.
11. An electronic lock for wearable electronics, the electronic lock comprising: a band configured to wrap around a human limb and secure wearable electronics to the human limb; an electronic lock secured to a portion of the band and configured to receive a distal end of the band and lock the band in a loop, wherein the electronic lock comprises: a contact member configured to receive a force applied by a user and move in a first direction when locking the electronic lock; a first resilient member coupled to the contact member and a housing of the lock, the first resilient member being configured to be biased by the contact member as a result of the contact member moving in the first direction when locking the electronic lock; a first locking member coupled to the contact member and configured to move with the contact member from an unlocked position to a locked position; an electronically controlled actuator coupled to the housing; a second locking member coupled to the electronically controlled actuator and configured to be moved by the electronically controlled actuator from a locked position to an unlocked position by moving in a second direction; a second resilient member coupled to the second locking member and configured to bias the second locking member in the locked position, wherein the second locking member is configured to block movement of the first locking member when in the locked position; a control circuit configured to receive a signal indicating the lock is to be unlocked and, in response, actuate the electronically controlled actuator, wherein the electronically controlled actuator is configured to, in response to being actuated, move the second locking member, further bias the second resilient member, and permit the first locking member to be moved into an unlocked position by the first resilient member.
12. The electronic lock of embodiment 11, wherein a distal portion of the first resilient member, the contact member, and guide member are part of a button assembly and are disposed in fixed relation to one another, wherein the button assembly has one and only one degree of freedom of movement relative to a housing of the electronic lock, the housing including an interface that is complementary to the guide member and configured to constrain the button assembly to the one degree of freedom.

13. The electronic lock of any of embodiments 11-12, wherein the electronically controlled actuator comprises a solenoid configured to effectuate a linear translation of the second locking member.

14. The electronic lock of embodiment 3, wherein the second locking member comprises a locking pin sized to be received by an aperture in the first locking member when in the locked position, and wherein the second resilient member comprises a compression spring disposed at least partially around at least part of the locking pin.

15. The electronic lock of any of embodiments 11-14, wherein the control circuit comprises a diode disposed in series between a pair of electrical leads of a coil of the solenoid and a transistor disposed in series between one of the electrical leads and either a source or sink of the control circuit.

16. The electronic lock of any of embodiments 11-15, wherein the first locking member comprises a distal portion sized to fit into a selected one of an array of apertures at different lengths along the band.

17. The electronic lock of any of embodiments 11-16, comprising: a processor; an antenna; a receiver coupling the antenna to the processor; and memory storing instructions that when executed by the processor effectuate operations comprising: receiving a wireless signal via the antenna indicating that the lock is to be unlocked; and outputting an actuation signal that causes the electronically controlled actuator to be actuated.

18. The electronic lock of embodiment 7, where the operations comprise steps for encrypting the wireless signal.

19. The electronic lock of embodiment 7, wherein the operations comprise steps for authenticating a pair of computing devices to one another.

20. The electronic lock of embodiment 7, wherein the operations comprise: outputting the actuation signal to a control pin of a transistor disposed in series between the electronically controlled actuator and a power source or sink; and blocking current from shorting across electrical conductors of the electronically controlled actuator while actuating; and after actuating, permitting transient current to flow directly between the electrical conductors of the electronically controlled actuator.

21. The electronic lock of embodiment 7, wherein the operations comprise: transmitting a beacon to a mobile computing device, the beacon indicating a distance between the mobile computing device and the wearable electronics.

22. The electronic lock of any of embodiments 11-21, wherein the first resilient member comprises: a U-shaped member having a first leg secured to the contact member and a second leg secured to a housing of the electronic lock.

23. The electronic lock of any of embodiments 11-22, wherein the first resilient member comprises: two or more legs secure to the housing of the electronic lock, wherein the first leg is disposed in a volume defined by a space between the two or more legs.

24. The electronic lock of any of embodiments 11-23, wherein the first resilient member comprises a single sheet of metal cut and bent into a shape of the first resilient member.

25. The electronic lock of any of embodiments 11-24, wherein the first locking member is configured to clamp against the band to secure the band in a closed loop.

26. The electronic lock of any of embodiments 11-25, wherein the first direction is orthogonal to the second direction.

27. The electronic lock of any of embodiments 11-26, wherein the first direction is a rotational movement and the first locking member comprises a threaded member.

28. The electronic lock of any of embodiments 11-27, wherein the first direction is a linear translation perpendicular to the band.

29. The electronic lock of any of embodiments 11-28, wherein the wearable electronics comprise means for monitoring an individual coupled to the band.

30. The electronic lock of any of embodiments 11-29, comprising: a mobile computing device having a processor and memory storing instructions that when executed by the processor cause the mobile computing device to monitor a distance between the wearable electronics and the mobile computing device.

What is claimed is:

1. An electronic lock for wearable electronics, the electronic lock comprising:
   a band configured to wrap around a human limb and secure wearable electronics to the human limb;
   an electronic lock secured to a portion of the band and configured to receive a distal end of the band and lock the band in a loop, wherein the electronic lock comprises:
      a contact member configured to receive a force applied by a user and move in a first direction when locking the electronic lock;
      a first resilient member coupled to the contact member and a housing of the lock, the first resilient member being configured to be biased by the contact member as a result of the contact member moving in the first direction when locking the electronic lock;
      a first locking member coupled to the contact member and configured to move with the contact member from an unlocked position to a locked position;
      an electronically controlled actuator coupled to the housing;
      a second locking member coupled to the electronically controlled actuator and configured to be moved by the electronically controlled actuator from the locked position to the unlocked position by moving in a second direction;
      a second resilient member coupled to the second locking member and configured to bias the second locking member in the locked position, wherein the second locking member is configured to block movement of the first locking member when in the locked position;
      a control circuit configured to receive a signal indicating the lock is to be unlocked and, in response, actuate the electronically controlled actuator,
      wherein the electronically controlled actuator is configured to, in response to being actuated, move the second locking member, further bias the second resilient member, and permit the first locking member to be moved into the unlocked position by the first resilient member.

2. The electronic lock of claim 1, wherein a distal portion of the first resilient member, the contact member, and guide member are part of a button assembly and are disposed in fixed relation to one another, wherein the button assembly has one and only one degree of freedom of movement relative to a housing of the electronic lock, the housing including an interface that is complementary to the guide member and configured to constrain the button assembly to the one degree of freedom.

3. The electronic lock of claim 1, wherein the electronically controlled actuator comprises a solenoid configured to effectuate a linear translation of the second locking member.

4. The electronic lock of claim 3, wherein the second locking member comprises a locking pin sized to be received by an aperture in the first locking member when in the locked position, and wherein the second resilient member comprises a compression spring disposed at least partially around at least part of the locking pin.

5. The electronic lock of claim 1, wherein the control circuit comprises a diode disposed in series between a pair of electrical leads of a coil of the solenoid and a transistor disposed in series between one of the electrical leads and either a source or sink of the control circuit.

6. The electronic lock of claim 1, wherein the first locking member comprises a distal portion sized to fit into a selected one of an array of apertures at different lengths along the band.

7. The electronic lock of claim 1, comprising:
a processor;
an antenna;
a receiver coupling the antenna to the processor; and
memory storing instructions that when executed by the processor effectuate operations comprising:
receiving a wireless signal via the antenna indicating that the lock is to be unlocked; and
outputting an actuation signal that causes the electronically controlled actuator to be actuated.

8. The electronic lock of claim 7, where the operations comprise steps for encrypting the wireless signal.

9. The electronic lock of claim 7, wherein the operations comprise steps for authenticating a pair of computing devices to one another.

10. The electronic lock of claim 7, wherein the operations comprise:
outputting the actuation signal to a control pin of a transistor disposed in series between the electronically controlled actuator and a power source or sink; and
blocking current from shorting across electrical conductors of the electronically controlled actuator while actuating; and
after actuating, permitting transient current to flow directly between the electrical conductors of the electronically controlled actuator.

11. The electronic lock of claim 7, wherein the operations comprise:
transmitting a beacon to a mobile computing device, the beacon indicating a distance between the mobile computing device and the wearable electronics.

12. The electronic lock of claim 1, wherein the first resilient member comprises:
a U-shaped member having a first leg secured to the contact member and a second leg secured to a housing of the electronic lock.

13. The electronic lock of claim 1, wherein the first resilient member comprises:
two or more legs secure to the housing of the electronic lock, wherein the first leg is disposed in a volume defined by a space between the two or more legs.

14. The electronic lock of claim 1, wherein the first resilient member comprises a single sheet of metal cut and bent into a shape of the first resilient member.

15. The electronic lock of claim 1, wherein the first locking member is configured to clamp against the band to secure the band in a closed loop.

16. The electronic lock of claim 1, wherein the first direction is orthogonal to the second direction.

17. The electronic lock of claim 1, wherein the first direction is a rotational movement and the first locking member comprises a threaded member.

18. The electronic lock of claim 1, wherein the first direction is a linear translation perpendicular to the band.

19. The electronic lock of claim 1, wherein the wearable electronics comprise means for monitoring an individual coupled to the band.

20. The electronic lock of claim 1, comprising:
a mobile computing device having a processor and memory storing instructions that when executed by the processor cause the mobile computing device to monitor a distance between the wearable electronics and the mobile computing device.

* * * * *